(12) United States Patent
Kim

(10) Patent No.: US 6,504,315 B2
(45) Date of Patent: Jan. 7, 2003

(54) LAMP SYSTEM WITH ELECTRONIC BALLAST

(75) Inventor: Dae-Bong Kim, Incheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 15 days.

(21) Appl. No.: 09/780,091

(22) Filed: Feb. 9, 2001

(65) Prior Publication Data

US 2002/0030456 A1 Mar. 14, 2002

(30) Foreign Application Priority Data

Feb. 10, 2000 (KR) .............................................. 00-6285

(51) Int. Cl.$^7$ ................................................ G05F 1/00
(52) U.S. Cl. ....................................... 315/224; 315/307
(58) Field of Search ................................. 315/224, 247, 315/291, 307, 308, 209 R, 219, 225, DIG. 5, DIG. 7

(56) References Cited

U.S. PATENT DOCUMENTS

| | | | |
|---|---|---|---|
| 5,677,602 A | * | 10/1997 | Paul et al. ................... 315/224 |
| 6,060,843 A | * | 5/2000 | Primisser et al. ........... 315/291 |
| 6,259,215 B1 | * | 7/2001 | Roman ....................... 315/307 |
| 6,366,032 B1 | * | 4/2002 | Allison et al. .............. 315/307 |

* cited by examiner

Primary Examiner—Don Wong
Assistant Examiner—Wilson Lee
(74) Attorney, Agent, or Firm—Alston & Bird LLP

(57) ABSTRACT

A lamp system including: a power-factor compensator, a current controller including first and second switches, the current controller being coupled to the on/off periods of the first and second switches for controlling the magnitude of a lamp driving current from the power-factor compensator; a lamp section including a resonance circuit composed of a resistor, an inductor and a capacitor, and emitting light under a current from the current controller; a ballast for forming a feedback voltage using a current flowing through the lamp section including soft start and dimming control. The lamp system compares the feedback voltage to a reference voltage to determine whether the current input to the lamp section is an overcurrent, an undercurrent, or a normal current. The ballast controls the on/off periods of the first and second switches.

49 Claims, 11 Drawing Sheets

LAMP SYSTEM WITH ELECTRONIC BALLAST

FIELD OF THE INVENTION

The present invention relates to a lamp system with an electronic ballast circuit. More specifically, the present invention pertains to a lamp system with an electronic ballast circuit capable of supplying the power consumed at the lamp in conformity with the intention of the designer.

BACKGROUND OF THE INVENTION

In general, a lamp system with an electronic ballast circuit performs an open loop control in order to generate a separate excitation frequency. During the open loop control, the separate excitation frequency for driving the LC (Inductor-Capacitor) resonance terminal of the lamp is varied due to errors of the time capacitor, as well as, the inductor or capacitor of the LC resonance terminal. As a result of this frequency variation the lamp may experience difficulty turning on and/or the brightness may vary, such that it is greater or less than the intended designed value.

SUMMARY OF THE INVENTION

It is an object of the present invention to solve the problems related to the prior art and to provide a lamp system with an electronic ballast circuit that performs a feedback closed control to detect the current flowing through the lamp and to compare the detected current to a reference voltage. In this regard, the lamp system controls the variation of the frequency occurring due to the errors of the elements and performs normal operational lamp control, as well as a soft start function and a soft dimming function.

To achieve the above object of the present invention, the lamp system with an electronic ballast circuit generates a reference voltage according to the user's on/off and illuminating directions. Once the reference voltage is generated it is compared to a voltage obtained by feeding back the current flowing through the lamp. The comparison thereby controls the magnitude of the current flowing through the lamp.

In one aspect of the present invention, there is provided a lamp system including a power supply, a current controller, a lamp section, and a feedback section.

The power supply is provided to supply power to the entire system, and the current controller includes first and second switches. The current controller is coupled to the on/off periods of the first and second switches to control the magnitude of a lamp driving current.

The lamp section is operated using the current supplied by the current controller. The feedback section generates a feedback voltage using the current flowing through the lamp section, and compares the feedback voltage to a reference voltage to determine whether the current input to the lamp section has a magnitude of an overcurrent, an undercurrent, or a normal current. Thus, the feedback section can control the on/off periods of the first and second switches.

In another aspect of the present invention, there is provided a ballast circuit including an undervoltage protector, a soft starter, a dimming controller, a feedback section, a frequency controller, and a switch driver.

The undervoltage protector prevents a malfunction of the entire system, and generates an initial operating signal of the entire system upon receiving a voltage of less than the voltage capable of operating the entire system.

The soft starter gradually increases a soft start voltage to a predetermined level to proceed with a start-up of the lamp upon receiving the initial operating signal from the undervoltage protector.

The dimming controller permits a gradual increase in voltage even when an externally input dimming signal is changed in order to regulate the light intensity.

The feedback section compares a feedback voltage generated based on the magnitude of the current flowing through the lamp to a reference voltage generated based on the output signals from the soft starter and the dimming controller. As a result of the comparison the feedback section provides normal operation to the lamp, as well as, soft start and soft dimming function capability. In addition, the feedback section determines whether the current flowing through the lamp is an overcurrent, an undercurrent, or a normal current.

The frequency controller generates first and second frequencies for regulating the magnitude of the current input to the lamp based on a received signal from the feedback voltage. The frequency controller generates the first frequency when the feedback voltage is greater than the reference voltage and the second frequency is [being] generated when the feedback voltage is less than the reference voltage.

The switch driver is coupled to the first and second frequencies to control the on/off state of the switch of the current controller.

In still another aspect of the present invention, there is provided a lamp system including a power-factor compensator, a current controller, a lamp section, a ballast, and a dimming voltage controller.

The power-factor compensator rectifies AC power and improves the power factor of the rectified AC power to increase the effective power supplied to the entire system.

The current controller includes first and second switches. The current controller is coupled to the on/off periods of the first and second switches for controlling the magnitude of a lamp driving current from the power-factor compensator.

The lamp section includes a resonance circuit composed of a resistor, an inductor and a capacitor, and it emits light under a current from the current controller.

The ballast forms a feedback voltage using a current flowing through the lamp section during operation of the lamp including during soft start and dimming control periods, and compares the feedback voltage to a reference voltage to determine whether the current input to the lamp section is an overcurrent, an undercurrent, or a normal current. Thus the ballast controls the on/off periods of the first and second switches.

The dimming voltage controller generates a dimming signal to the ballast to perform the dimming control of the lamp.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Hereinafter, a description will be given in detail as to a lamp system with an electronic ballast according to an embodiment of the present invention with reference to the accompanying drawings.

Figure 1:
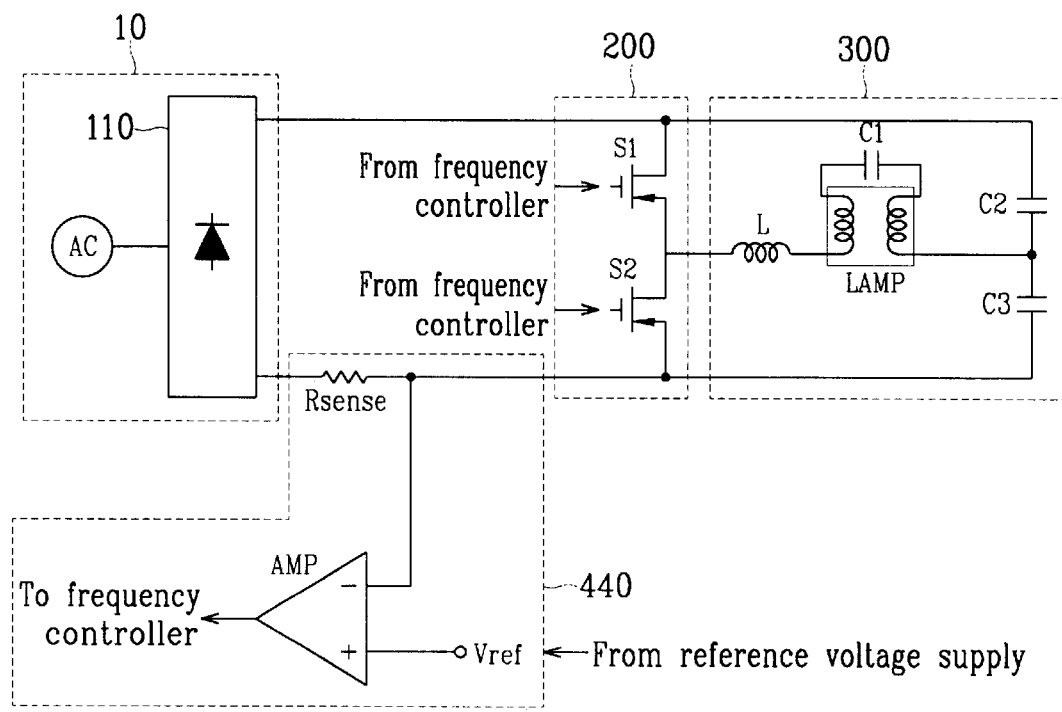
FIG. 1 is a circuit diagram illustrating the mechanism of a lamp system with an electronic ballast according to an embodiment of the present invention.

FIG. 1 is a circuit diagram illustrating the mechanism of a lamp system with an electronic ballast according to the embodiment of the present invention.

Referring to FIG. 1 the lamp system includes a power supply 10, a current controller 200, a lamp section 300, and a feedback section 440.

As an input current AC is applied from the power supply 10, a lamp driving current is supplied to the lamp section 300 based on the ON/OFF states of switches S1 and S2 of the current controller 200. With switch S1 ON and switch S2 OFF, the lamp driving current flows through switch S1, inductor L, lamp LAMP and capacitor C3. With switch S1 OFF and switch S2 ON, the lamp driving current flows through capacitor C2, lamp LAMP, inductor L and switch S2.

If the switch S1 is ON, the switch S2 being OFF, inductor L and capacitors C1 and C3 then form a resonance circuit; otherwise, if the switch S1 is OFF, the switch S2 being ON, capacitors C2 and C3 and inductor L form a resonance circuit to emit light from the lamp LAMP.

The current flowing through the lamp LAMP passes through a resistor $R_{sense}$ to form a feedback voltage, which is then applied to the amplifier AMP and compared to the reference voltage $V_{ref}$. The feedback voltage is amplified by the magnifying power of the amplifier AMP and then output to a frequency controller.

When an overcurrent flows through the lamp LAMP to increase the feedback voltage and hence the voltage applied to the frequency controller, the frequency controller raises a frequency input to the gate of the current controller 200 to reduce the duty factors of the switches S1 and S2 and hence the current flowing through the lamp section 300.

When an undercurrent flows through the lamp LAMP to decrease the feedback voltage and hence the voltage applied to the frequency controller, the frequency controller lowers a signal frequency input to the current controller 200 to increase the duty factors of the switches S1 and S2 and hence the current flowing through the lamp section 300.

Meanwhile, a reference voltage supply (not shown) adjusts the reference voltage $V_{ref}$ input to the amplifier AMP of the feedback section 440 in conformity to the operation of the lamp system, namely, soft start, normal operation, or soft dimming, so that the lamp section 300 is operated according to the intention of the user.

Figure 2:
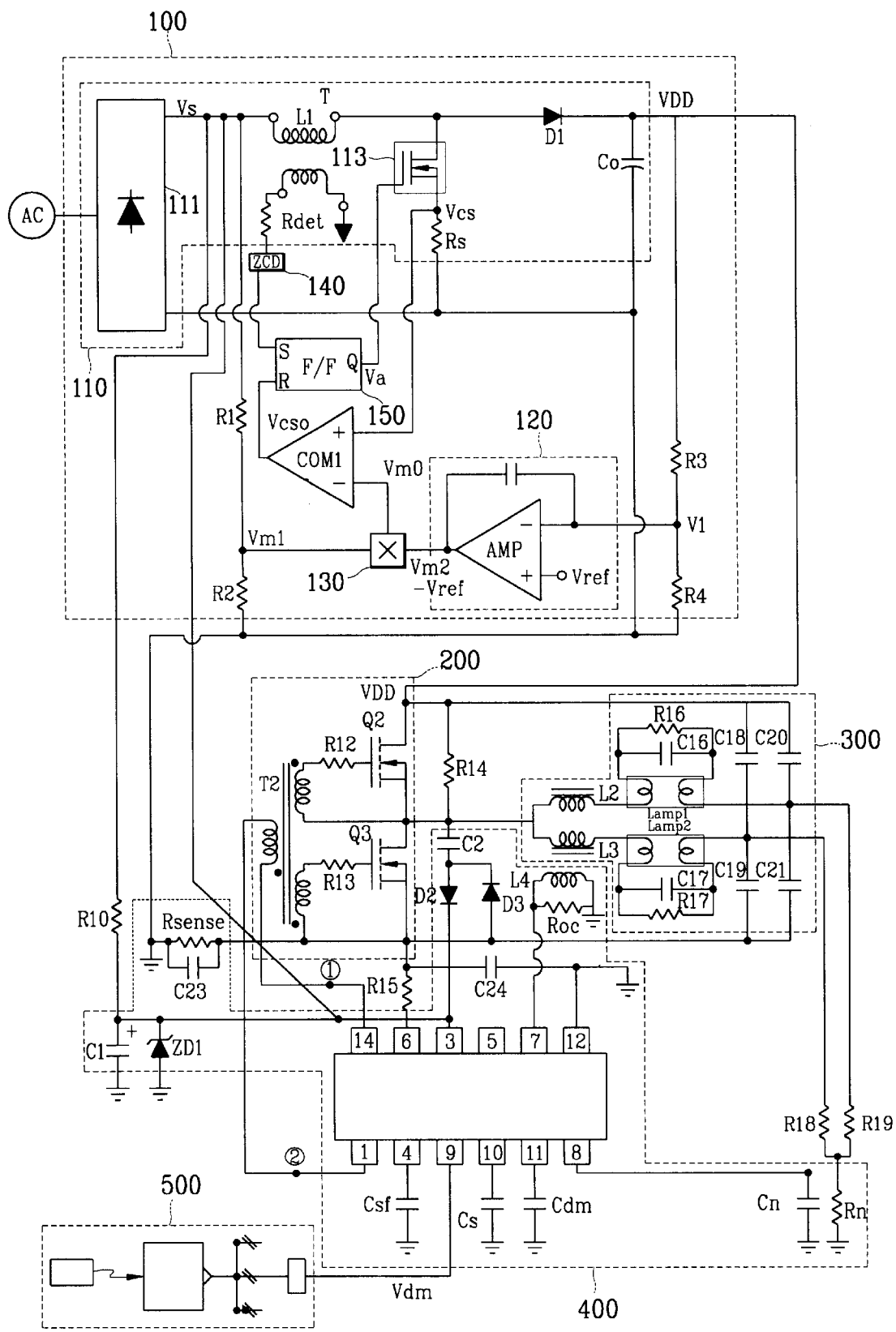
FIG. 2 is a circuit diagram of a lamp system with an electronic ballast according to an embodiment of the present invention.

FIG. 2 is a circuit diagram of a lamp system with an electronic ballast according to the embodiment of the present invention.

As shown in FIG. 2, the lamp system with an electronic ballast includes a power-factor compensator 100, a current controller 200, a lamp section 300, a ballast 400, and a dimming voltage controller 500.

The power-factor compensator 100 rectifies an AC power and improves the power factor of the rectified AC power to increase the effective power supplied to the entire system, and includes a boost converter 110, an error amplifier 120, an arithmetic circuit 130, a comparator COM1 132, a zero current detector 140, and a switching driver 150.

The boost converter 110 is composed of a rectifier 111 for rectifying an input AC voltage into an output power voltage, a transformer T, a diode D1, resistors $R_s$ and $R_{det}$, a capacitor C0 and a switching MOS FET (Field Effect Transistor) 113.

One terminal of the secondary coil of the transformer T is connected to the resistor $R_{det}$, the source of the switching MOS FET 113 being grounded via the resistor $R_s$. A contact between the source of the switching MOS FET 113 and the resistor $R_s$ is connected to a non-inverting input of the comparator COM1 132.

The error amplifier 120 has an inverting input for receiving a voltage V1, which is the output voltage $V_{DD}$ of the boost converter 110 divided by resistances R3 and R4. Additionally, the error amplifier 120 has a non-inverting input for receiving the reference voltage $V_{ref}$.

The arithmetic circuit 130 receives the output voltage $(V_{m2}-V_{ref})$ of the error amplifier 120 and a voltage $V_{m1}$, which is the input power divided by resistances R1 and R2, and outputs a voltage $V_{m0}$ given by Equation 1:

$$V_{m0} = K \times V_{m1} \times (V_{m2} - V_{ref})$$ Equation 1 where K is a proportional constant.

The comparator COM1 132 compares the output voltage $V_{m0}$ of the arithmetic circuit 130 (the inverting input) to a voltage $V_{cs}$, obtained by sensing the current flowing through the switching MOS FET 113 (the non-inverting input), and then outputs a voltage $V_{cso}$.

The zero current detector 140 detects the time when the current flowing through the secondary coil of the transformer T becomes zero by the magnitude of the detected voltage $V_{det}$ applied to the resistor $R_{det}$.

The switching driver 150 receives the output voltage of the zero current detector 140 and the output voltage $V_{cso}$ of the comparator COM1 132 as a set signal S and a reset signal R, respectively, and applies the output Q to the gate of the switching MOS FET 113.

Figure 3:
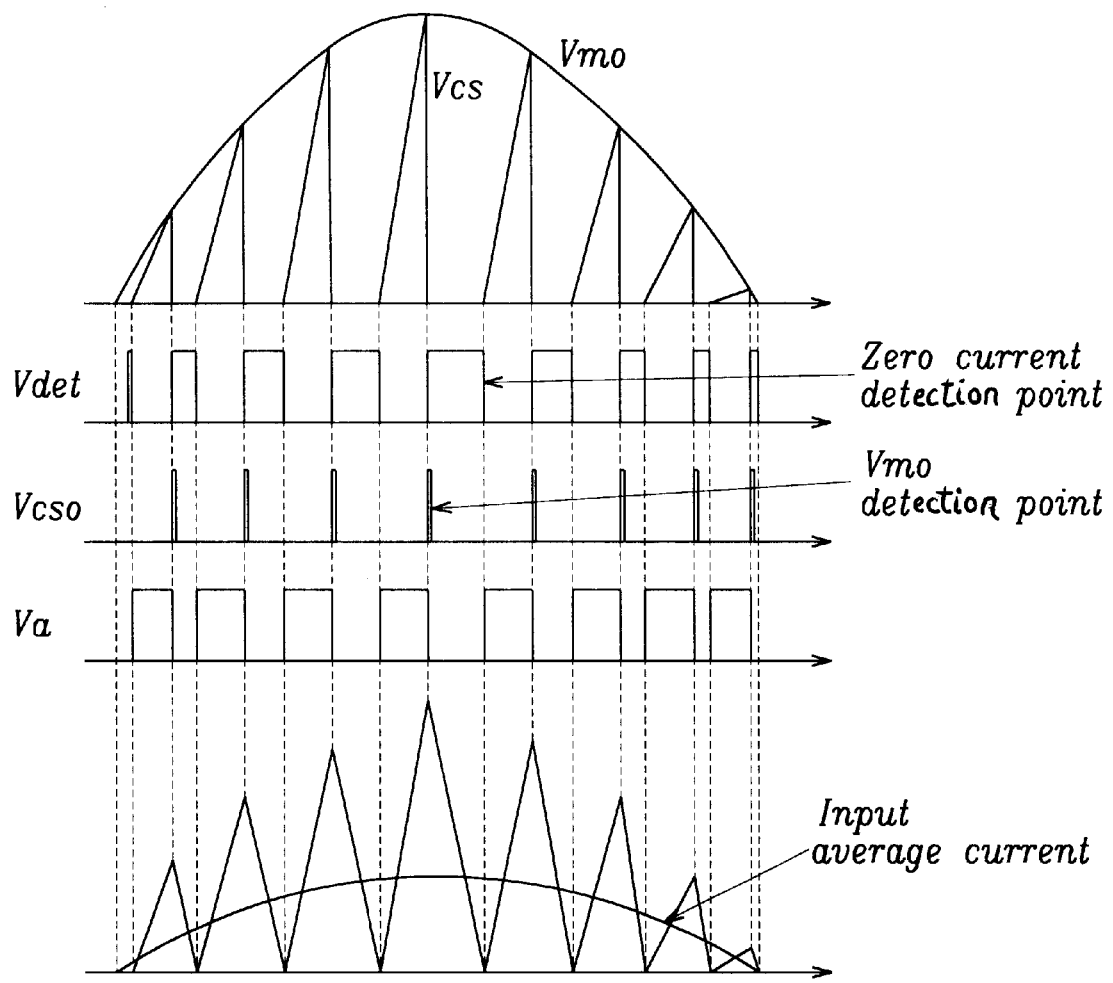
FIG. 3 is a waveform diagram illustrating the operation of a power-factor compensator in accordance with an embodiment of the present invention.

Now, a description will be given as to the operation of the power-factor compensator 100 for the embodiment of the present invention with reference to FIGS. 2 and 3.

The comparator COM1 132 compares the voltage $V_{cs}$ to the voltage $V_{m0}$ and outputs a pulse signal at the time when the voltage $V_{cs}$ becomes greater than the voltage $V_{m0}$. The pulse signal resets the switching driver 150 to turn OFF the switching MOS FET 113, so that the switching MOS FET 113 is switched OFF at the time when the voltage $V_{cs}$ is equal to the voltage $V_{m0}$.

The output voltage $V_{m0}$ of the arithmetic circuit 130 is, as understood from Equation 1, proportional to the voltage $V_{m1}$, which is the distributed voltage of the input voltage $V_s$. Therefore, the waveform of the voltage $V_{m0}$ has the same phase as that of the power voltage $V_s$.

When the switching MOS FET 113 is switched ON, there is a nearly linear increase in the current flowing through the primary coil L1 of the transformer T and hence the sensed voltage $V_{cs}$ as shown in FIG. 2. When the sensed voltage $V_{cs}$ is equal to the voltage $V_{m0}$, the comparator COM1 132 outputs a pulse voltage. As a result, the switching driver 150 is reset to turn the switching MOS FET 113 OFF.

With the switching MOS FET 113 OFF, the primary coil L1 of the transformer T emits a counter electromotive force to make the voltage $V_{det}$ have a positive value. Therefore, when the switching MOS FET 113 is OFF, the current flowing through the primary coil L1 of the transformer T decreases in a nearly linear manner and approaches zero.

The voltage $V_{det}$ approaches zero at the time when no current flows (i.e., at zero current), so that the zero current detector 140 outputs a high voltage. This high voltage is applied to the set terminal of the switching driver 150 to set the switching driver 150, and the output voltage $V_a$ of the switching driver 150 is in a 'high' state.

Consequently, the switching MOS FET 113 is switched ON and the above procedures are repeated. Such a repetition of the above procedures forms an input average current having the same phase as the voltage $V_{m0}$ to provide electric power with an improved power factor to the lamp system.

The current controller 200 includes a transformer T2 and switches Q2 and Q3, the transformer T2 having a primary coil connected to the ballast and a secondary coil composed of two windings so as to form two secondary voltages, the switches Q2 and Q3 having gates connected to the two secondary outputs.

The current controller 200 has the primary coil connected to the ballast and coupled to an input signal frequency at the ballast, thus changing the direction of the current flowing through the primary coil. The two secondary windings are opposite to each other in winding direction so that the direction of the switch driving current at the secondary coil is also reversed according to the changed direction of the current at the primary coil. Consequently, the switches Q2 and Q3 connected to the two secondary windings are not switched ON at the same time and have switching frequencies proportional to an input signal frequency applied to the primary coil of the transformer T2 from the ballast.

That is, with an increase in the signal frequency applied to the primary coil of the transformer T2 from the ballast, the duty ratio at which the switches Q2 and Q3 are turned ON becomes smaller and the current passing through the switches Q2 and Q3 during one cycle also decreases. As the signal frequency decreases, the duty ratio at which the switches Q2 and Q3 are turned ON becomes larger and the current flowing through the switches Q2 and Q3 during one cycle increases.

The lamp section 300 includes first and second lamps LAMP1 and LAMP2 for emitting light with an input lamp driving current under the control of the current controller 200, and inductors L2 and L3 and capacitors C16, C17, C18, C19, C20 and C21 that are connected to the first and second lamps LAMP1 and LAMP2 to form a resonance circuit.

The inductors L2 and L3 and the capacitors C16, C17, C18, C19, C20 and C21 are configured to form a resonance circuit under the control of the current controller 200. That is, with the switch Q2 of the current controller 200 ON and the switch Q3 OFF, an input current of the first lamp LAMP1 has a path formed in the order of a parallel circuit composed of inductor L2, lamp LAMP1, resistor R16 and capacitor C16, and capacitor C21; and an input current of the second lamp LAMP2 has a path formed in the order of a parallel circuit composed of inductor L3, lamp LAMP2, resistor R17 and capacitor C17, and capacitor C19.

With the switch Q2 of the current controller 200 OFF and the switch Q3 ON, an input current of the first lamp LAMP1 has a path in the order of a parallel circuit composed of capacitor C20, lamp LAMP1, resistor R16 and capacitor C16, and inductor L2; and an input current of the second lamp LAMP2 has a path formed in the order of a parallel circuit composed of capacitor C18, lamp LAMP2, resistor R17 and capacitor C17, and inductor L3. The inductors, capacitors and resistors on each current path are configured to form a resonance circuit.

Figure 16:
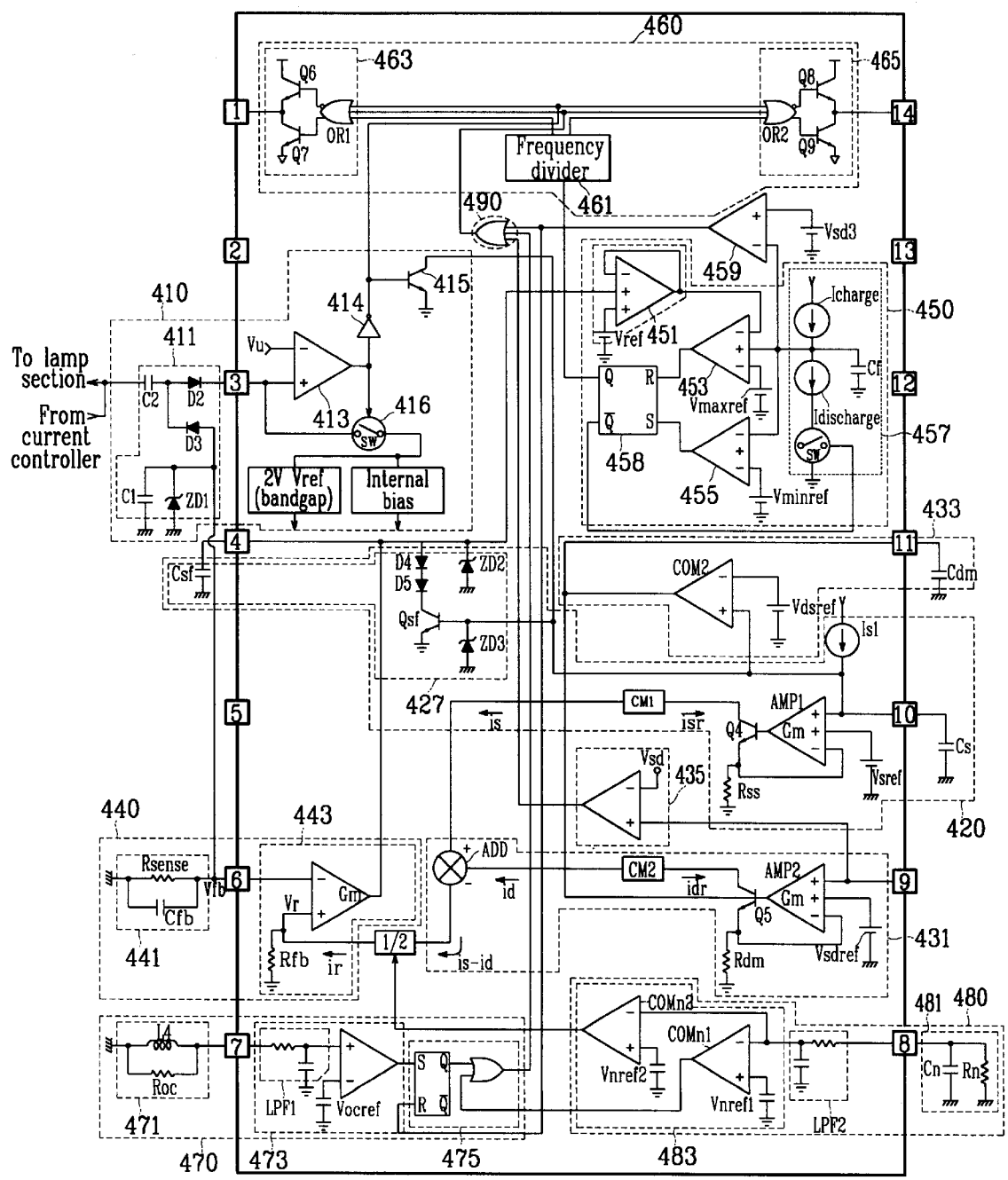
FIG. 16 is an overall circuit diagram of an electronic ballast illustrating the lamp system according to an embodiment of the present invention.

The ballast 400 controls the magnitude of the current flowing through the lamp section 300 by the user's manipulations in order to operate the entire system safely and accurately, and includes, as shown in FIG. 16, an undervoltage protector 410, a soft starter 420, a dimming controller 430 (not designated as such in FIG. 16 but including 431, 433 and 435), a feedback section 440, a frequency controller 450, a switch driver 460, an overcurrent protector 470, a lamp selector 480, and a shutdown controller 490.

Hereinafter, reference will be made as to the respective components of the ballast with reference to the accompanying drawings.

Figure 4:
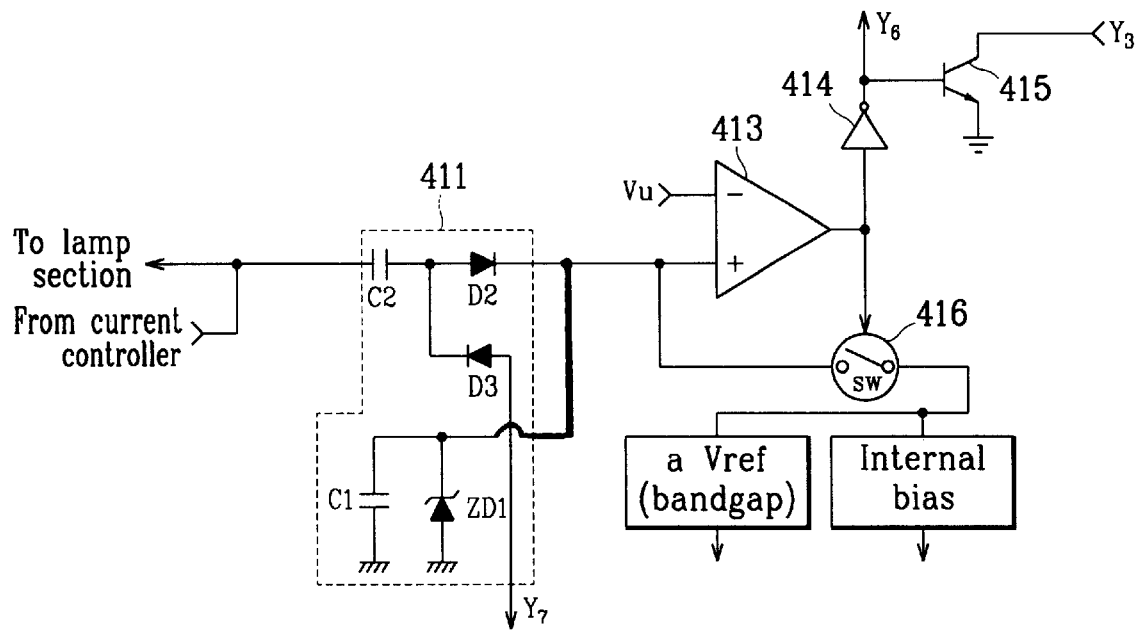
FIG. 4 is a circuit diagram of an undervoltage protector for an embodiment of the present invention.

FIG. 4 is a circuit diagram of the undervoltage protector 410 for the embodiment of the present invention.

As illustrated in FIG. 4, the undervoltage protector 410 is to prevent a malfunction of the entire system under an input of a voltage of less than the operating voltage of the system, and includes an ignition and operating voltage section 411, an undervoltage detector 413, and a first shutdown section 415.

The ignition and operating voltage section 411 generates an ignition voltage for starting the entire system with an input current of the power-factor compensator 100 under an input starting signal of the entire system, and then receives a current from the current controller 200 to form a voltage for maintaining the operation of the entire system.

The ignition and operating voltage section 411 includes capacitors C1 and C2 and diodes D2 and D3, with one terminal of the capacitor C1 connected to the output of the rectifier 111, one terminal of the capacitor C2 connected to the source of the switch Q2, the anode of the diode D2 connected to the other terminal of the capacitor C2, the cathode of the diode D2 connected to one terminal of the capacitor C1, the cathode of the diode D3 connected to a common terminal that is coupled to the other terminal of the capacitor C2 and the anode of the diode D2, and the anode of the diode D3 connected to the common terminal of the capacitors C19 and C21.

The ignition and operating voltage section 411 forms an ignition voltage to start the entire system when a start signal for the entire system causes a power supply voltage $V_s$ output via the rectifier 111 of the power-factor compensator 100 to accumulate a defined amount of charge. This ignition voltage is not enough to operate the entire system. So, when the switch Q2 of the current controller 200 is ON, with the switch Q3 OFF, the current supplied by the current controller 200 is charged in the capacitor C2 and, if discharged completely, charged again in the reverse direction of the previous charging operation of the capacitor C2 via the lamp section 300 and the diode D3 to form an operation maintenance voltage. With diode D3 OFF and diode D2 ON, the operation maintenance voltage formed at the capacitor C2 is applied to the undervoltage detector 413.

The cathode of Zener diode ZD1 is connected to one terminal of the capacitor C1 and the other terminal of the capacitor C1 is grounded so as to clamp the maximum of the ignition voltage and thereby prevent an overvoltage from being applied to the undervoltage protector 410.

The undervoltage detector 413 compares a voltage from the ignition and operating voltage section 411 to a reference voltage $V_u$ so as to prevent a malfunction of starting-up the entire system with an input voltage of less than the ignition voltage.

This undervoltage detector 413 includes a comparator, which compares the ignition voltage and the operation maintenance voltage received from the ignition and operating voltage section 411 at a non-inverting input to an undervoltage reference voltage $V_u$. The comparator adopts a Schmidt trigger circuit having a hysteresis characteristic to output a 'high' or 'low' signal accurately at the time when the ignition voltage and the operation maintenance voltage are equal to the undervoltage reference voltage $V_u$.

The first shutdown section 415 includes a transistor for stopping the operation of the entire system when the ignition voltage and the operation maintenance voltage are less than the undervoltage reference voltage $V_u$. The transistor has a base connected to the output of the undervoltage detector 413, an emitter being grounded, and a collector connected to a soft capacitor $C_s$ of the soft starter 420 that will be described later.

Now, a description will be given as to the operation of the undervoltage protector with reference to the accompanying drawings.

As an initial system start signal is input, the power supply voltage $V_s$ rectified at the rectifier 111 gives a charge of electricity to the capacitor C1 and the voltage applied to the capacitor C1 increases gradually. If the voltage applied to the capacitor C1 is less than the undervoltage reference voltage $V_u$, the 'low' signal output from the comparator is converted to a 'high' signal via a signal inverter 414 and the 'high' signal turns on the first shutdown section 415. The first shutdown section 415 when actuated sinks the electric charge at the soft capacitor $C_s$ to ground, thus inhibiting the operation of the entire system.

If the voltage applied to the capacitor C1 continues being increased to a voltage greater than the undervoltage reference voltage $V_u$, the comparator, using a Schmidt trigger circuit, outputs a 'high' signal immediately. This 'high' signal is converted to a 'low' signal via the signal inverter 414 to turn off the first shutdown section 415, which begins charging the soft capacitor $C_s$ and hence the soft start of the entire system.

When the start-up of the entire system actuates the current controller 200 to turn the switch Q2 ON and the switch Q3 OFF, the current supplied by the current controller 200 is charged in the capacitor C2 and, if discharged completely, charged again in the reverse direction of the previous charging operation of the capacitor C2 via the lamp section 300 and the diode D3 to form an operation maintenance voltage. With diode D3 OFF and diode D2 ON, the operation maintenance voltage formed at the capacitor C2 is applied to the undervoltage detector 413.

If the voltage applied to the non-inverting input of the undervoltage detector 413 is greater than the undervoltage reference voltage $V_u$, the undervoltage detector 413 outputs a 'high' signal to turn on the switch 416 and the voltage applied to the non-inverting input forms an aV reference voltage $V_{ref}$ and an internal bias voltage via the switch 416.

Figure 5:
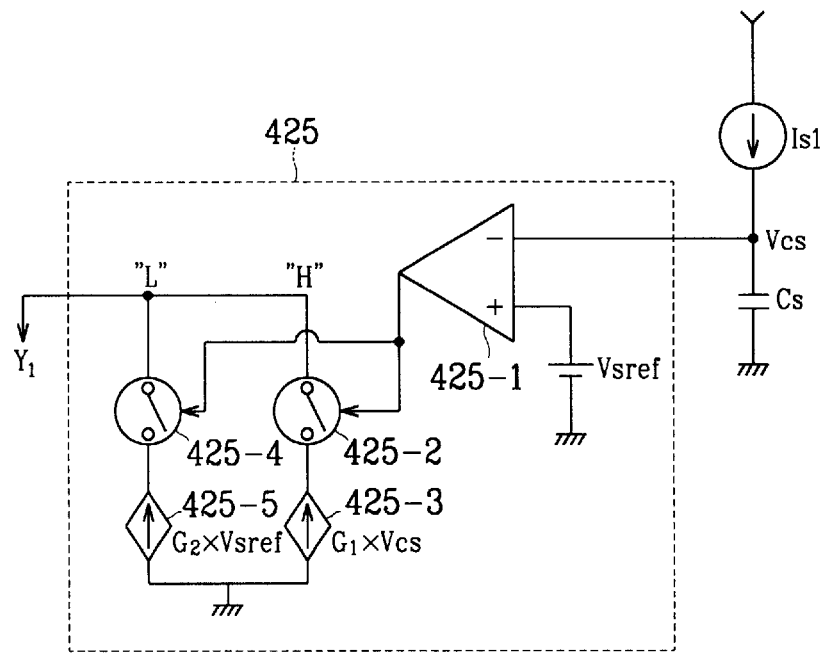
FIG. 5 is an equivalent circuit diagram of a soft starter for an embodiment of the present invention.

FIG. 5 is an equivalent circuit diagram of the soft starter for the embodiment of the present invention.

Figure 6:
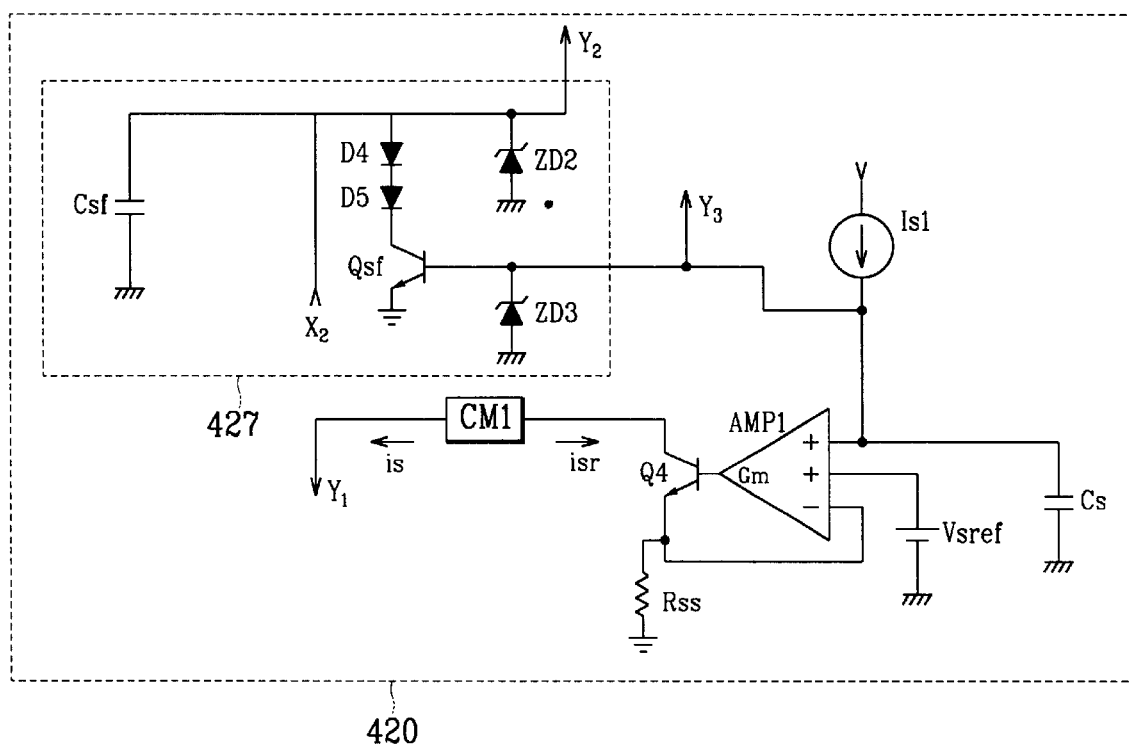
FIG. 6 is an actual circuit diagram of the soft starter for an embodiment of the present invention.

As shown in FIG. 5, the soft starter 420 includes a first current supply $I_{s1}$ for supplying the current upon receiving the ignition voltage from the undervoltage protector, a start voltage generator $C_s$ for forming a start voltage with a predetermined time delay upon receiving the current from the first current supply $I_{s1}$, a start reference voltage generator 425, and a start frequency generator 427 (as shown in FIG. 6).

The start voltage generator $C_s$ has one terminal connected to one terminal of the first current supply $I_{s1}$, the other terminal being grounded.

The start reference voltage generator 425 includes a comparator 425-1, a first switch 425-2, a first controlled current source 425-3, a second switch 425-4, and a second controlled current source 425-5.

The comparator 425-1 has an inverting terminal connected to a common terminal coupled to the start voltage generator $C_s$ and the first current supply $I_{s1}$, and a non-inverting terminal for receiving a soft start reference voltage $V_{sref}$. If the comparator 425-1 outputs a 'high' signal, the first switch 425-2 is turned ON; otherwise, when the comparator 425-1 outputs a 'low' signal, the second switch 425-4 is turned ON.

The first controlled current source 425-3 has one terminal connected to the first switch 425-2, and generates a current having a magnitude of $G_1 \times V_{cs}$ when the comparator 425-1 outputs a 'high' signal to turn the first switch ON.

The second controlled current source 425-5 has one terminal connected to the second switch 425-4, and generates a current having a magnitude of $G_2 \times V_{sref}$ when the comparator 425-1 outputs a 'low' signal to turn the second switch 425-4 ON.

The start frequency generator 427, shown in the actual soft starter circuit drawing of FIG. 6, is provided to form a voltage for the initial frequency of the frequency controller 450 during the initial operation of the soft starter 420, and includes diodes D4 and D5, transistor $Q_{sf}$, and capacitor $C_{sf}$.

The transistor $Q_{sf}$ has a base connected to a common terminal coupled to the first current supply $I_{s1}$ and the start voltage generator $C_s$, an emitter connected to the cathode of the diode D5, and a collector being grounded.

The cathode of the diode D4 is connected to the anode of the diode D5. One terminal of the capacitor $C_{sf}$ is connected to a common terminal coupled to the output of the feedback section 440 and the anode of the diode D4, the common terminal being connected to the input of the frequency controller 450.

When the first current supply $I_{s1}$ gives an electric charge to the start voltage generator $C_s$ and gradually increases the start voltage $V_{cs}$ to be applied to the base of the transistor $Q_{sf}$, the pnp-type transistor $Q_{sf}$ is initially ON and then is switched OFF. With the transistor $Q_{sf}$ ON, the diodes D4 and D5 are turned ON to cause a voltage drop of about 2.1 V (0.7V×3) and give the corresponding amount of electric charge from the feedback section 440 to the capacitor $C_{sf}$.

Accordingly, applying voltage to the capacitor $C_{sf}$ of the start frequency generator 427 at the same time as the operation of the soft starter 420 actuates the frequency controller 450 to gradually increase the start voltage $V_{cs}$ and turn the transistor $Q_{sf}$ OFF, so that the subsequent input voltage of the frequency controller 450 becomes a voltage output to the feedback section 440.

The transistor $Q_{sf}$ can be protected with a Zener diode ZD3, which has a cathode connected to the base of the transistor $Q_{sf}$ and an anode being grounded, and clamps an overvoltage otherwise applied to the base of the transistor $Q_{sf}$.

The frequency controller 450 can also be protected with a Zener diode ZD2, which has a cathode connected to the anode of the diode D4 and an anode being grounded, and clamps an overvoltage otherwise applied to the frequency controller 450.

Now, a description will be given in detail as to the operation of the soft starter 420 with reference to the accompanying drawings.

When an ignition voltage greater than the undervoltage reference voltage $V_u$ is applied to the inverting terminal of the undervoltage detector 413, the first shutdown section 415 is turned OFF to give an electric charge to the start voltage generator $C_s$ via the first current supply $I_{s1}$, forming a start voltage. The start voltage is gradually increased with the time delay of the start voltage generator $C_s$. Thus the ignition voltage applied does not immediately actuate the entire system but permits gradual formation of the start voltage $V_{cs}$ by the start voltage generator $C_s$, thus alleviating the shock on the entire system.

The start voltage $V_{cs}$ is gradually increased from zero as the first current supply $I_{s1}$ gives an electric charge to the start voltage generator $C_s$, at the early stage where the start voltage generator $C_s$ hardly has any residual electric charge. With the ignition voltage applied, the start voltage is still less than the start reference voltage $V_{sref}$ and the comparator 425-1 outputs a 'high' signal to turn the first switch 425-2 ON, causing the first controlled current source 425-3 to generate a current having a magnitude of $G_1 \times V_{cs}$.

If the start voltage $V_{cs}$ is gradually increased above the soft start reference voltage $V_{sref}$, the comparator 425-1 outputs a 'low' signal to turn the second switch 425-4 ON, thus causing the second controlled current source 425-5 to generate a current having a magnitude of $G_2 \times V_{sref}$.

The currents of $G_1 \times V_{cs}$ and $G_2 \times V_{sref}$ form a reference voltage at a soft starting stage that will be compared to the feedback voltage later.

FIG. 6 is an actual circuit diagram of the soft starter for the embodiment of the present invention.

As shown in FIG. 6, the soft starter used in the embodiment of the present invention includes a first current supply $I_{s1}$, a start voltage generator $C_s$, a first current amplifier AMP1, a transistor Q4, and a first current mirror CM1.

The first current supply $I_{s1}$ and the start voltage generator $C_s$ are the same as described above and will not be further described.

The first current amplifier AMP1 and the first current mirror CM1 have the same function as the above-stated start reference voltage generator 425. The first current amplifier AMP1 selects the lower of the start voltage $V_{cs}$ and the soft start reference voltage $V_{sref}$, which are fed into the two non-inverting inputs of the first current amplifier AMP1, respectively. For this purpose, the first current amplifier AMP1 has one non-inverting input connected to a common terminal coupled to the first current supply $I_{s1}$ and the start voltage generator $V_{sref}$, and the other non-inverting input connected to the anode of the soft start reference voltage $V_{sref}$. The inverting input of the first current amplifier AMP1 is connected to one terminal of resistor $R_{ss}$.

The output of the first current amplifier AMP1 turns transistor Q4 ON so that the first current mirror CM1 supplies the transistor Q4 with a current to be coupled to the voltage selected by the first current amplifier AMP1. For this purpose, the transistor Q4 has a base connected to the output of the first current amplifier AMP1, and an emitter connected to one terminal of the resistor $R_{ss}$.

The first current mirror CM1 supplies not only a current to be coupled to the voltage selected by the first current amplifier AMP1 but also a current of the same magnitude as the feedback section 440. The voltage supplied to the feedback section 440 from the first current mirror CM1 forms a reference voltage to be compared with the feedback voltage. For this purpose, the first current mirror CM1 has one terminal connected to the emitter of the transistor Q4 and the other terminal connected to the feedback section 440.

Now, a description will be given as to the operation of the first current amplifier with reference to the accompanying drawings.

Figure 7:
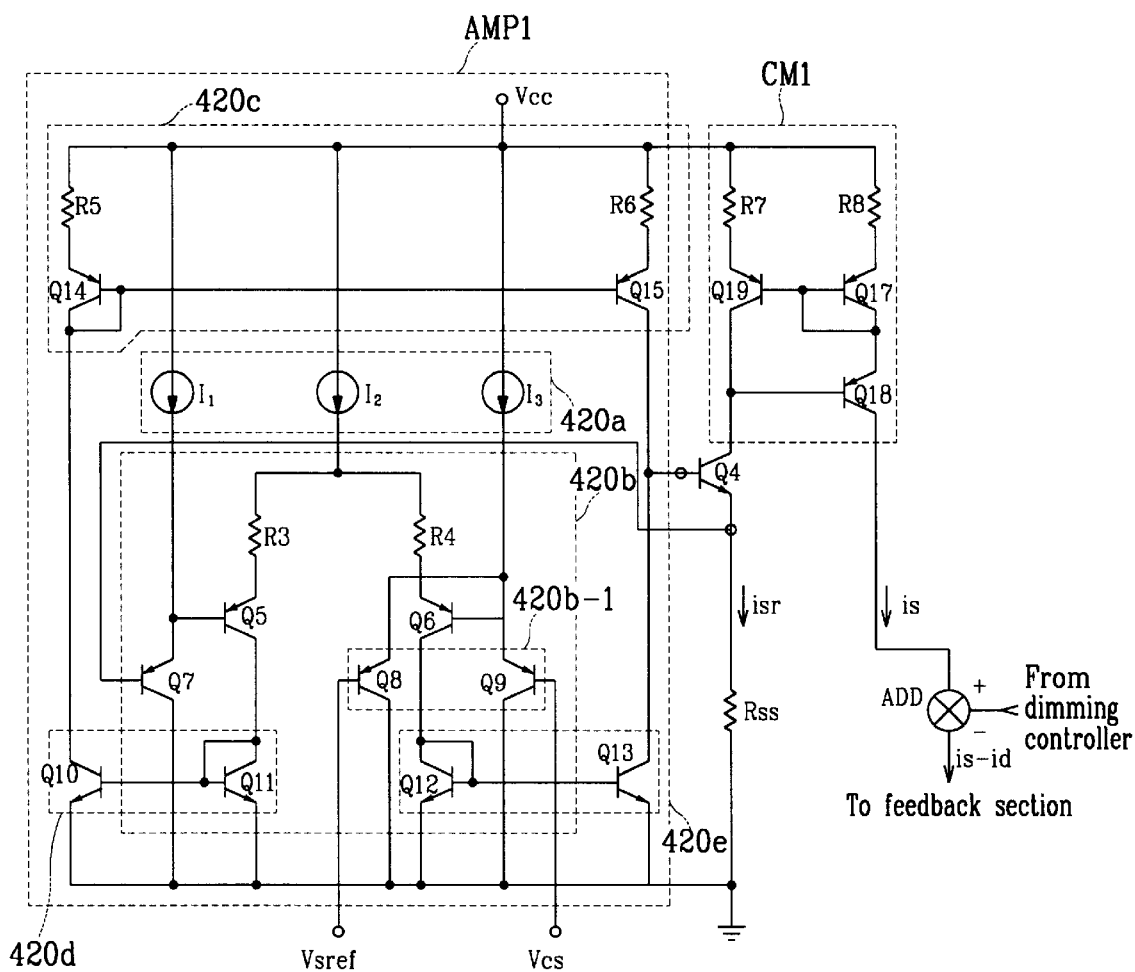
FIG. 7 is a circuit diagram of a first current amplifier according to an embodiment of the present invention.

FIG. 7 is a circuit diagram of the first current amplifier according to the embodiment of the present invention.

As shown in FIG. 7, the first current amplifier AMP1 comprises an internal current supply 420a including first, second and third current sources I1, I2 and I3; a differential amplifier 420b including transistors Q5, Q6, Q7, Q8, Q9, Q11 and Q12, and resistors R3 and R4; a first internal current mirror 420c including transistors Q14 and Q15, and resistors R5 and R6; a second internal current mirror 420d including transistors Q10 and Q11; and a third internal current mirror 420e including transistors Q12 and Q13.

The internal current supply 420a supplies a driving current to the differential amplifier 420b.

The differential amplifier 420b includes a selector circuit 420b-1 connected to a common terminal of the emitters of the transistors Q8 and Q9, the selector circuit 420b-1 having a common terminal connected to the base of the transistor Q6, the bases of the transistors Q8 and Q9 being connected to the two non-inverting inputs of the first current amplifier AMP1. The differential amplifier 420b includes the transistor Q7, which has an emitter connected to the base of the transistor Q5, and a base connected to one terminal of the first resistor $R_{ss}$.

The selector circuit 420b-1 has pnp-type transistors Q8 and Q9, so that only the transistor with the lower of the input voltages $V_{sref}$ and $V_{cs}$ at its base is turned ON and connected to the base of the transistor Q6.

The first internal current mirror 420c generates the same current via the transistors Q14 and Q15.

The second internal current mirror 420d generates, via the transistors Q10 and Q11, a current of the same magnitude as the current flowing through the transistor Q14 of the first internal current mirror 420c.

The third internal current mirror 420e generates, via the transistors Q12 and Q13, a current of the same magnitude as the current flowing through the transistor Q15 of the first internal current mirror 420c.

Now, a description will be given in detail as to the operation of the first current amplifier according to the embodiment of the present invention with reference to FIG. 7.

When voltages $V_{sref}$ and $V_{cs}$ are less than the source voltage $V_{cc}$, $V_{sref}$ and $V_{cs}$ are applied to the non-inverting input of the first current amplifier AMP1 and one of the transistors Q8 and Q9 of the selector circuit 420b-1 that receives the lower of the voltages $V_{sref}$ and $V_{cs}$ is turned ON.

This is because the transistors Q8 and Q9 have emitters connected to each other via a common terminal and collectors being grounded so that the current from the current source I3 flows almost through one transistor even at a relatively low voltage difference as given by $V_{sref}-V_{cs}$.

When one of the transistors Q8 and Q9 is ON, the other being OFF, the differential amplifier 420b forms a symmetric circuit configuration.

Also, the first internal current mirror 420c generates currents of the same magnitude via the transistors Q14 and Q15 and these currents flow through the transistor Q10 of the second internal current mirror 420d and the transistor Q13 of the third internal current mirror 420e.

As the current flowing through the transistor Q11 of the second internal current mirror 420d and the transistor Q13 of the third internal current mirror 420e have the same magnitude as the current from the first internal current mirror 420c, the current flowing through the transistors Q10, Q11, Q12 and Q13 are all the same in magnitude.

If the differential amplifier 420b is constituted by the same resistors R3 and R4, and the same transistors Q5 and Q6, making the currents of the same magnitude flow through the transistors Q5 and Q6, the same voltage has to be applied to the bases of the transistors Q5 and Q6 and the voltage applied to the first resistor $R_{ss}$ becomes equal to the lower one of the voltages $V_{sref}$ and $V_{cs}$.

As such, the first current amplifier AMP1 selects the lower of the voltages applied to the two non-inverting inputs and the selected voltage becomes equal to the voltage at the inverting input of the first current amplifier AMP1.

Now, a description will be given as to the operation of the soft starter actually used according to the embodiment of the present invention with reference to FIG. 6.

When an ignition voltage greater than the undervoltage reference voltage $V_u$ is applied to the inverting terminal of the undervoltage detector 413 (FIG. 4), the first shutdown section 415 (FIG. 4) is turned OFF to give an electric charge to the start voltage generator $C_s$ via the first current supply $I_{s1}$, forming a start voltage. The start voltage is gradually increased by the time delay of the start voltage generator $C_s$. Thus the ignition voltage applied does not immediately actuate the entire system but permits gradual formation of the start voltage $V_{cs}$ by the start voltage generator $C_s$, thus alleviating the shock on the entire system.

The start voltage $V_{cs}$ is gradually increased from zero as the first current supply $I_{s1}$ gives an electric charge to the start voltage generator $C_s$, at the early stage where the start voltage generator $C_s$ hardly has a residual charge. With the ignition voltage applied, the start voltage $V_{cs}$ is still less than the start reference voltage $V_{sref}$ and the first current amplifier AMP1 selects the start voltage $V_{cs}$.

The voltage applied to the inverting terminal of the first current amplifier AMP1 is the start voltage $V_{cs}$, so that the current flowing through the resistor $R_{ss}$ has a magnitude as given by Equation 2:

$$i_{sr} = V_{cs} \div R_{ss} \qquad \text{Equation 2}$$

where $i_{sr}$ represents the current flowing through the resistor $R_{ss}$.

The current $i_{sr}$ is output at one terminal of the current mirror CM1, the current $i_s$ of the same magnitude as the current $i_{sr}$ being output at the other terminal of the current mirror CM1.

The first current amplifier AMP1 selects the soft start reference voltage $V_{sref}$ at the time when the start voltage $V_{cs}$ is gradually increased to exceed the soft start reference voltage $V_{sref}$, that is, immediately after the completion of the soft starting. Thus the voltage applied to the resistor $R_{ss}$ becomes the soft start reference voltage $V_{sref}$, so that the current flowing through the resistor $R_{ss}$, has a magnitude as given by Equation 3:

$$i_{sr} = V_{sref} \div R_{ss} \qquad \text{Equation 3}$$

The current $i_{sr}$ is output at one terminal of the current mirror CM1, with the current $i_s$ of the same magnitude as the current $i_{sr}$ being output at the other terminal of the current mirror CM1.

Figure 8:
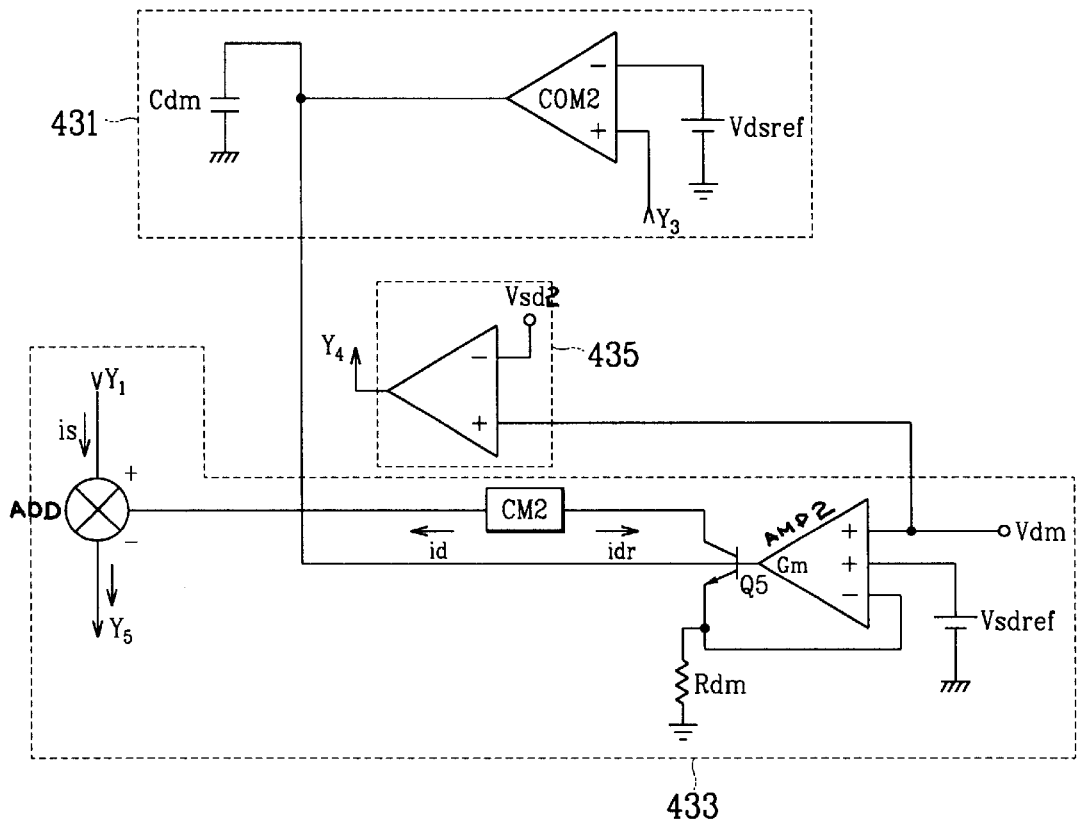
FIG. 8 is a circuit diagram of a dimming controller for an embodiment of the present invention.

FIG. 8 is a circuit diagram of a dimming controller for the embodiment of the present invention.

As shown in FIG. 8, the dimming controller 430 prevents a sudden change in the intensity of the light to alleviate the shock on the system, and includes a dimming starter 431 for starting the dimming control, a soft dimmer 433 for forming a reference voltage for soft dimming, and a second shutdown section 435 to prevent a voltage above a normal value from being applied as a dimming voltage $V_{dm}$ to the entire system.

The dimming starter 431 includes a dimming starting detector COM2 for supplying an electric charge upon receiving a voltage greater than a dimming starting reference voltage $V_{dsref}$, and a time delay $C_{dm}$ for charging/discharging the electric charge supplied by the dimming starting detector COM2 with a time delay.

The dimming starting detector COM2 has a non-inverting terminal connected to a common terminal that is coupled to the first current supply $I_{s1}$ and the start voltage generator $C_s$, and an inverting terminal connected to the anode of the dimming starting reference voltage $V_{dsref}$. With the start voltage $V_{cs}$ of the start voltage generator $C_s$ being greater than the dimming starting reference voltage $V_{dsref}$, the dimming starting detector COM2 outputs a 'high' signal to provide an electric charge to the time delay $C_{sm}$, which then performs a charging/discharging with a predetermined time delay.

The soft dimmer 433 determines the amount of charge to be accumulated in the time delay $C_{dm}$ and supplies a current for forming a dimming reference voltage to be compared with the feedback voltage based on the externally input dimming voltage. The soft dimmer 433 includes an dimming reference voltage generator AMP2, a transistor Q5 turned on by the output of the dimming reference voltage generator AMP2, a resistor $R_{dm}$, a second current mirror CM2 and an adder ADD.

The dimming reference voltage generator AMP2, which is similar to the above-stated first current amplifier AMP1, selects the lower one of the externally input dimming voltage $V_{dm}$ and a soft dimming reference voltage $V_{sdref}$ and applies the selected voltage to the resistor $R_{dm}$. The dimming reference voltage generator AMP2 has one non-inverting terminal connected to the dimming voltage $V_{dm}$ and the other non-inverting terminal connected to the anode of the soft dimming reference voltage $V_{sdref}$. The circuit diagram of the dimming reference voltage generator AMP2 is similar to that of the first current amplifier AMP1 and will not be further described.

The resistor $R_{dm}$ is connected to the inverting terminal of the dimming reference voltage generator AMP2 to receive the selected voltage from the dimming reference voltage generator AMP2.

The transistor Q5 has a base connected to the output of the dimming reference voltage generator AMP2, and an emitter connected to a common terminal coupled to the resistor $R_{dm}$ and the dimming reference voltage generator AMP2. Thus the transistor Q5 provides a path for the current flowing through the resistor $R_{dm}$ when the selected voltage of the dimming reference voltage generator AMP2 is applied to the resistor $R_{dm}$. For this purpose, one output of the second current mirror CM2 is connected to the collector of the transistor Q5.

Adder ADD has a first terminal connected to the other output of the first current mirror CM1 of the soft starter 420, a second terminal connected to the other output of the second current mirror CM2, and a third terminal connected to the feedback section 440, thus subtracting the output current of the second current mirror CM2 from the output current of the first current mirror CM1 and generating the result to the feedback section 440. This operation of the adder ADD causes the feedback section 440 to form a voltage to be compared with the feedback voltage during soft starting, normal operation, soft dimming and normal dimming.

A second shutdown section 435 is to prevent a voltage above a normal value from being applied as a dimming voltage $V_{dm}$ to the entire system. The second shutdown section 435 has an inverting terminal connected to a second shutdown reference voltage $V_{sd2}$ and a non-inverting terminal connected to the dimming voltage $V_{dm}$.

Now, a description will be given in detail as to the operation of the dimming controller 430 with reference to FIG. 8.

When the first current supply $I_{s1}$ provides an electric charge to the start voltage generator $C_s$, the start voltage $V_{cs}$ is gradually increased to exceed the dimming starting reference voltage $V_{dsref}$ and a 'high' signal is output to supply an electric charge to the dimming power supply $C_{dm}$, thus completing the preparation for dimming control. The voltage applied to the dimming power supply $C_{dm}$ is the sum of a voltage between the emitter and the base of the transistor Q5 and a voltage applied to the resistor $R_{dm}$, so that the amount of electric charge accumulated in the dimming power supply $C_{dm}$ is determined by the sum of the voltage between the emitter and the base of the transistor Q5 and the voltage applied to the resistor $R_{dm}$.

With the dimming voltage $V_{dm}$ applied while the electric charge is accumulated in the dimming power supply $R_{dm}$, the dimming reference voltage generator AMP2 compares the dimming voltage $V_{dm}$ to the soft dimming reference voltage $V_{sdref}$ and applies the lower one to the resistor $R_{dm}$.

If the dimming voltage $V_{dm}$ is less than the soft dimming reference voltage $V_{sdref}$, the current flowing through the resistor $R_{dm}$ via the second current mirror has a magnitude as given by Equation 4:

$$i_{dr} = V_{dm} \div R_{dm} \qquad \text{Equation 4}$$

where $i_{dr}$ represents the current supplied from one output of the second current mirror.

Thus the other output of the second current mirror outputs a current $i_d$ of the same magnitude as the current $i_{dr}$ to the adder ADD. The adder ADD subtracts the current $i_d$ from a current $i_s$ at the other output of the first current mirror CM1, and sends the result to the feedback section 440.

If the dimming voltage $V_{dm}$ is less than the soft dimming reference voltage $V_{sdref}$, $V_{dm}$ is varied to a voltage $V_{dm1}$, the voltage applied to the resistor $R_{dm}$ connected to the inverting terminal of the dimming reference voltage generator AMP2. It should be noted that the change from $V_{dm}$ to $V_{dm1}$ is not sudden but gradually reduced by the time delay of the dimming power supply $C_{dm}$.

As the voltage applied to the resistor $R_{dm}$ is gradually changed to $V_{dm1}$, the current $i_d$ input to the adder ADD from the second current mirror CM2 slowly varies and hence a current $i_s$–$i_d$ output from the adder ADD varies as well. This prevents a sudden change in the magnitude of the current supplied to the lamp section 300 during dimming.

The time delay of the dimming power supply $C_{dm}$ is give by Equation 5:

$$\Delta t = C_{dm} \times (V_{dm} + V_{be}) \div i_{ds} \qquad \text{Equation 5}$$

where $\Delta t$ represents the time delay; $C_{dm}$ the capacity of the dimming power supply; $V_{dm}$ the voltage applied to the resistor $R_{dm}$; and $I_{cdm}$ the current charged/discharged in/from the dimming power supply.

If the dimming voltage $V_{dm}$ is greater than a predetermined voltage due to external noise, the second shutdown section 435 outputs a 'high' signal to interrupt the current supply to the lamp section 300 and thereby to protect the entire system.

Figure 9:
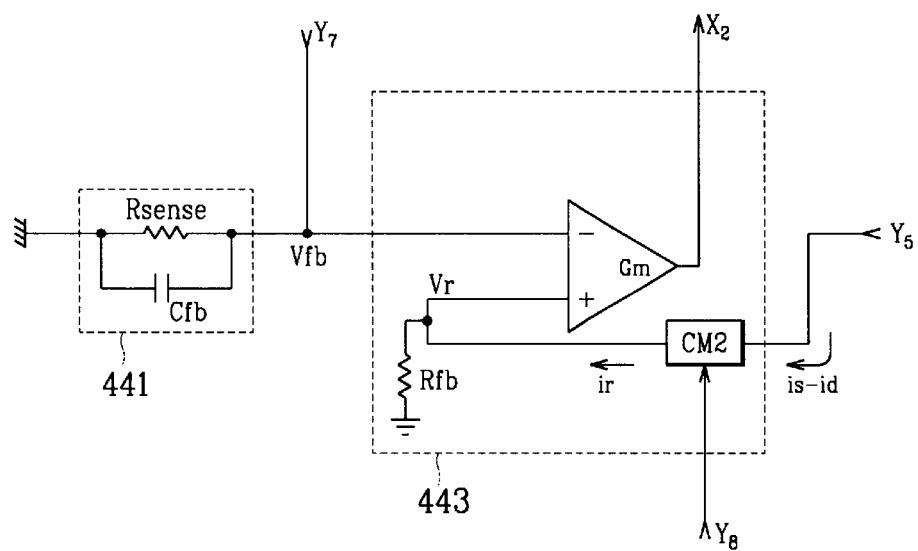
FIG. 9 is a circuit diagram of a feedback section for an embodiment of the present invention.

FIG. 9 is a circuit diagram of the feedback section for the embodiment of the present invention.

As shown in FIG. 9, the feedback section 440 for the embodiment of the present invention includes a feedback voltage generator 441, and a reference voltage comparator 443.

The feedback voltage generator 441 includes a sense resistor $R_{sense}$ having one terminal connected to the lamp section 300 for detecting the magnitude of the current output from the lamp section 300; and a feedback capacitor $C_{fb}$ having one terminal connected to one terminal of the sense resistor $R_{sense}$ and the other terminal being grounded for accumulating an electric charge of as much as the voltage applied to the sense resistor $R_{sense}$.

The reference voltage comparator 443 has an inverting terminal connected to the common terminal of the sense resist $R_{sense}$ and the feedback capacitor $C_{fb}$ for receiving a feedback voltage $V_{fb}$, and a non-inverting terminal connected to the common terminal of a resistor $R_{fb}$ and a current mirror CM2 for receiving a reference voltage applied to the resist $R_{fb}$ by the input current from the adder ADD, thus comparing the feedback voltage $V_{fb}$ to the reference voltage.

If the feedback voltage $V_{fb}$ is greater than the reference voltage, the reference voltage comparator 443 subtracts a predetermined current from the feedback capacitor $C_{fb}$; otherwise, if the feedback voltage $V_{fb}$ is less than the reference voltage, the reference voltage comparator 443 supplies a predetermined current to the feedback capacitor $C_{fb}$.

Now, a description will be given as to the operation of the feedback section 440 with reference to FIG. 9.

The current $i_s - i_d$ output from the adder ADD flows through the resistor $R_{fb}$ to form a reference voltage to be compared with the feedback voltage $V_{fb}$ according to the operation of the lamp system such as soft start, normal operation, soft dimming and normal dimming. That is, as the magnitude of the current $i_s - i_d$ varies depending on the operation of the lamp system, the magnitude of the reference voltage applied to the resistor $R_{fb}$ is also changed.

Therefore, the reference voltage comparator 443 compares the feedback voltage $V_{fb}$ formed by the feedback voltage generator 441 from the current output from the lamp section 300 with the reference voltage. If the feedback voltage $V_{fb}$ is greater than the reference voltage, the reference voltage comparator 443 subtracts a predetermined current from the capacitor $C_{fb}$; otherwise, if the feedback voltage $V_{fb}$ is less than the reference voltage, the reference voltage comparator 443 supplies a predetermined current to the capacitor $C_{fb}$.

Figure 10:
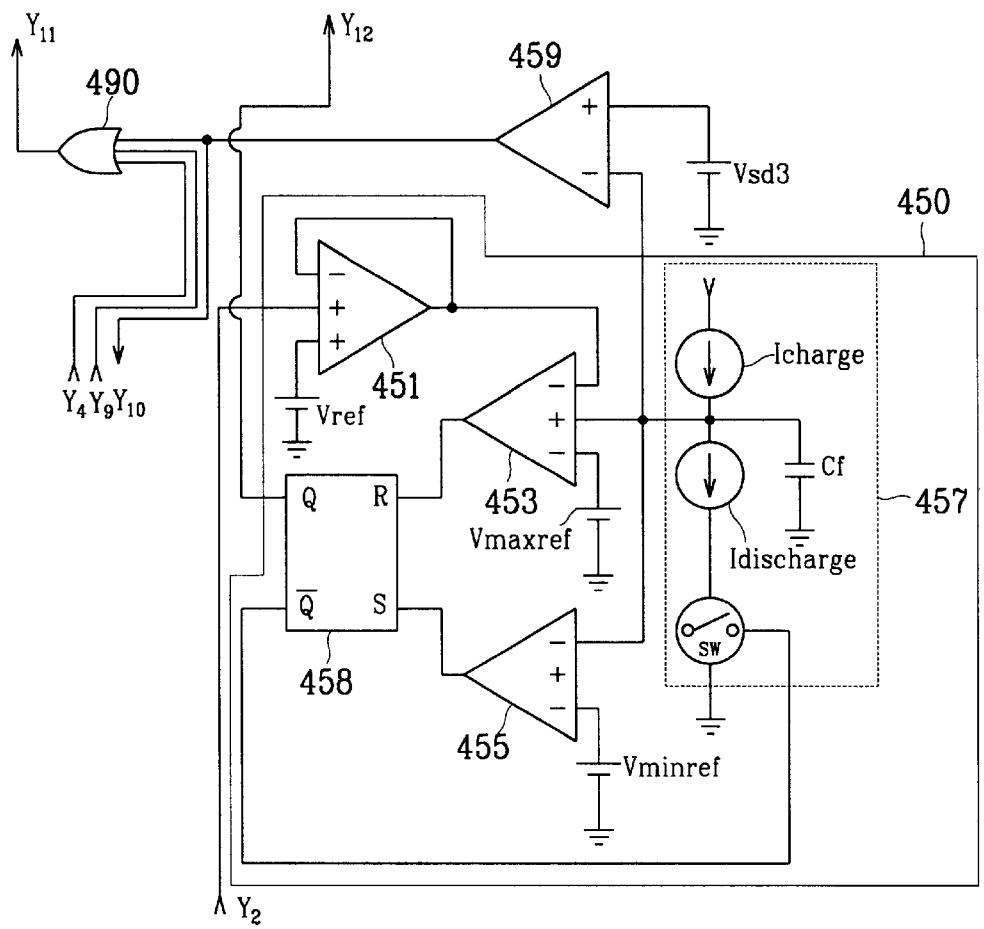
FIG. 10 is a circuit diagram of a frequency controller for an embodiment of the present invention.

FIG. 10 is a circuit diagram of the frequency controller for the embodiment of the present invention.

As shown in FIG. 10, the frequency controller 450 for the embodiment of the present invention is to control a frequency for regulating the magnitude of the current applied to the lamp section 300 based on the magnitude of the voltage formed at the capacitor $C_{fb}$ from a predetermined input/output current of the feedback section 440 by comparison of the feedback voltage $V_{fb}$ with the reference voltage formed from the current $i_s - i_d$. The frequency controller 450 raises the frequency to reduce the magnitude of the current applied to the lamp section 300 when an overcurrent flows through the lamp section 300, and lowers the frequency to increase the magnitude of the current applied to the lamp section 300 when an undervoltage flows through the lamp section 300.

The frequency controller 450 includes a voltage selector 451, a maximum voltage selector 453, a minimum voltage selector 455, a comparative voltage generator 457, a frequency generator 458, and a third shutdown section 459.

The voltage selector 451 receives an initial voltage for operating the frequency controller 450 during the initial soft start at the start frequency generator 427 of the soft starter 420, and, when the current begins to flow through the lamp after an elapse of time, compares a voltage output from the feedback section 440 to a reference voltage $V_{ref}$ to exclusively output the greater one.

The voltage selector 451 has one non-inverting terminal connected to the output of the reference voltage comparator 443 of the feedback section 440, and the other non-inverting terminal connected to the reference voltage $V_{ref}$. The voltage selector 451 has the output connected to the non-inverting terminals of the voltage selector 451 and the maximum voltage selector 453 so as to select the greater one of the voltages applied to these two non-inverting terminals.

The maximum voltage detector 453 detects the maximum voltage to which the comparative voltage can be raised during the operation of the lamp section 300. Therefore, the longer time is required for the comparative voltage to approach the maximum voltage with an increase in the maximum voltage. The maximum voltage detector 453 has one inverting terminal connected to the output of the voltage selector 451, and the other inverting terminal connected to a maximum reference voltage $V_{maxref}$.

The minimum voltage detector 455 detects the minimum voltage to which the comparative voltage can be dropped during the operation of the lamp section 300. The minimum voltage detector 455 has a non-inverting terminal connected to a minimum reference voltage $V_{minref}$, and an inverting terminal connected to the non-inverting terminal of the maximum voltage detector 453.

The comparative voltage generator 457 forms a comparative voltage to be compared at the maximum voltage detector 453 and the minimum voltage detector 455, and includes a charge supply $I_{charge}$, a current remover $I_{discharge}$, a charger $C_f$, and a switch SW.

One terminal of the charge supply $I_{charge}$ is connected to one terminal of the charger $C_f$ for supplying an electric charge to the charger $C_f$.

One terminal of the current remover $I_{discharge}$ is connected to a common terminal coupled to the charge supply $I_{charge}$ and the charger $C_f$ for removing an electric charge. The current remover $I_{discharge}$ according to the embodiment of the present invention rapidly eliminates the electric charge relative to the charge supply rate of the charge Supply $I_{charge}$.

The switch SW has one terminal connected to the other terminal of the current remover $I_{discharge}$, and the other terminal grounded. With the switch SW turned ON, the electric charge in the charger $C_f$ is discharged via the current remover $I_{discharge}$.

The frequency generator 458 includes an SR latch, which has a reset terminal R connected to the output of the maximum voltage detector 453 and a set terminal S connected to the minimum voltage detector 455, and outputs a signal having a frequency based on the output signals of the maximum voltage detector 453 and the minimum voltage detector 455.

When a voltage aV is applied to the voltage selector from the feedback section 440 while a normal current flows through the lamp section 300, the reference voltage $V_{ref}$, the maximum reference voltage $V_{maxref}$ and the minimum reference voltage $V_{minref}$ satisfy the inequality as represented by Equation 6:

$$V_{minref} < V_{ref} < aV < V_{maxref} \qquad \text{Equation 6}$$

In an embodiment of the present invention, the reference voltage $V_{ref}$ is 2 V and the voltage selector selects a voltage of 2 V formed at the start frequency generator 427 as the reference voltage $V_{ref}$ during the initial start.

The third shutdown section 459 is to interrupt the current applied to the lamp section 300 when a voltage $V_{cf}$ is less than a predetermined voltage due to a certain factor. The third shutdown section 459 includes a comparator, which has a non-inverting terminal connected to a third shutdown reference voltage and an inverting terminal connected to one terminal of the charger $C_f$, to interrupt the current applied to the lamp section 300 when the voltage applied to the charger $C_f$ is less than the third shutdown reference voltage $V_{sd3}$.

Now, a description will be given as to the operation of the frequency controller 450 with reference to FIGS. 10 and 11.

Figure 11:
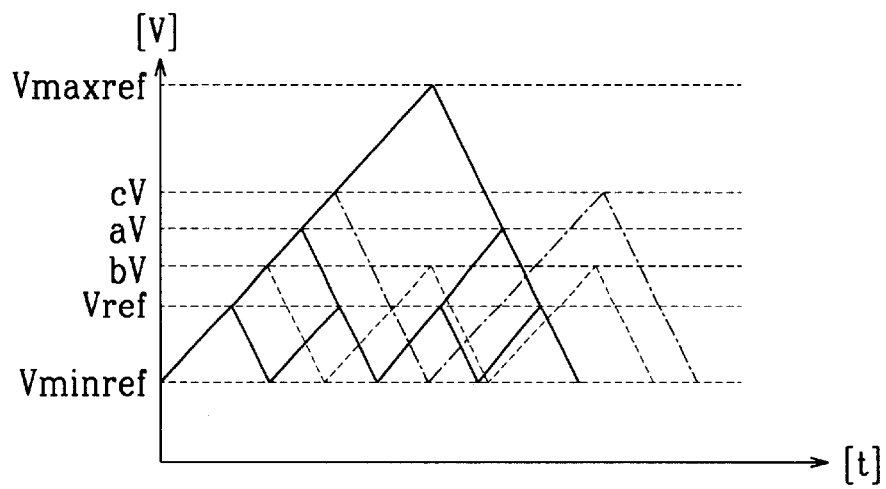
FIG. 11 is a waveform diagram illustrating the operation of the frequency controller according to an embodiment of the present invention.

FIG. 11 is a waveform diagram illustrating the operation of the frequency controller according to the embodiment of the present invention. This waveform diagram is for the voltage applied to the capacitor $C_f$.

When the soft starter 420 performs a soft start to generate a start voltage $V_{cs}$, the transistor $Q_{sf}$ of the start frequency generator 427 to which the start voltage $V_{cs}$ is applied is switched OFF. With the transistor $Q_{sf}$ ON, the diodes D4 and D5 are also turned ON and the feedback section 440 provides an electric charge to the capacitor $C_{sf}$. The electric charge supplied to the capacitor $C_{sf}$ causes the frequency controller 450 to have a voltage of about 2 V, which is the sum of voltage drops when the diodes D4 and D5 and the transistor $Q_{sf}$ are all ON.

Subsequently, the start voltage $V_{cs}$ is raised to turn the transistor $Q_{sf}$ OFF so that the voltage from the feedback section 440 is output to the frequency controller 450 to control the frequency.

When a voltage aV is applied to the voltage selector 451 from the feedback section 440, while a normal current flows through the lamp section 300, the voltage selector 451 compares the voltage aV to the reference voltage to select the greater one.

The input voltage during normal operation is greater than the reference voltage as expressed by Equation 6, and the voltage selector 451 outputs the voltage aV to the maximum voltage detector 453.

The maximum voltage detector 453 compares the received voltage aV to the maximum reference voltage $V_{maxref}$ to select the lower one, i.e., aV. The maximum voltage detector 453 then compares the voltage aV to a voltage $V_{cf}$ applied to the capacitor $C_f$.

If the voltage $V_{cf}$ is less than the voltage aV and greater than the minimum reference voltage $V_{minref}$, both the maximum voltage detector 453 and the minimum voltage detector 455 output a 'low' signal, and thus the frequency generator 458 maintains the previous output.

As the frequency generator 458 maintains the previous output, the charge supply $I_{charge}$ continues to supply an electric charge to the capacitor $C_f$. When the voltage $V_{cf}$ applied to the capacitor $C_f$ is continuously increased to the voltage aV, the maximum voltage detector 453 outputs a 'high' signal. The voltage $V_{cf}$ is also applied to the inverting terminal of the minimum voltage detector 455 and is greater than the minimum reference voltage $V_{minref}$, so that the minimum voltage detector 455 outputs a 'low' signal.

Upon receiving the 'high' signal from the maximum voltage detector 453 and the 'low' signal from the minimum voltage detector 455, the frequency generator 458 with a reset terminal R receiving the 'high' signal outputs a 'high' signal at its output $\overline{Q}$. Under the 'high' signal from the output $\overline{Q}$, the switch SW is turned ON and the current remover $I_{diacharge}$ removes the electric charge from the capacitor $C_f$.

Removal of the electric charge continuously reduces the voltage $V_{cf}$ to the minimum reference voltage $V_{minref}$, so that the maximum voltage detector 453 outputs a 'low' signal and the minimum voltage detector 455 outputs a 'high' signal.

Upon receiving the 'high' signal at the set terminal S, the frequency generator 458 outputs a 'high' signal at the output Q and a 'low' signal at the output $\overline{Q}$ to turn OFF the switch SW. Thus the capacitor $C_f$ is supplied with an electric charge by the current supply $C_f$ to raise the voltage $V_{cf}$.

When a normal current is applied to the lamp section 300, as shown in FIG. 11, the voltage $V_{cf}$ has a waveform in which the voltage varies between the voltage aV and the minimum reference voltage $V_{minref}$. In addition, the output Q of the frequency generator 458 generates a frequency proportional to the frequency of the waveform.

If an overcurrent flows through the lamp section 300 during the operation of the lamp system to increase the feedback voltage $V_{fb}$ applied to the sense resistor $R_{sense}$, the reference voltage comparator 443 subtracts a predetermined current from the capacitor $C_{sf}$ and the voltage applied to the voltage selector 451 from the feedback section 440 is bV that is lower than aV.

The voltage selector 451 compares the voltage bV to the reference voltage $V_{ref}$ and exclusively outputs the greater one, i.e., bV, to the maximum voltage detector 453, because the input voltage bV is greater than the reference voltage $V_{ref}$ under an overcurrent flowing through the lamp section 300.

The maximum voltage detector 453 compares the voltage bV to the maximum reference voltage $V_{maxref}$ to select the lower one, i.e., bV, which is then compared to the voltage $V_{cf}$ applied to the capacitor $C_f$.

If the voltage $V_{cf}$ is less than the voltage bV and greater than the minimum reference voltage $V_{minref}$, both the maximum voltage detector 453 and the minimum voltage detector 455 output a 'low' signal and thus the frequency generator 458 maintains the previous output.

As the frequency generator 458 maintains the previous output, the charge supply $I_{charge}$ continues to supply an electric charge to the capacitor $C_f$. When the voltage $V_{cf}$ applied to the capacitor $C_f$ is continuously increased to the voltage bV, the maximum voltage detector 453 outputs a 'high' signal. The voltage $V_{cf}$ is also applied to the inverting terminal of the minimum voltage detector 455 and is greater than the minimum reference voltage $V_{minref}$, so the minimum voltage detector 455 outputs a 'low' signal.

Upon receiving the 'high' signal from the maximum voltage detector 453 and the 'low' signal from the minimum voltage detector 455, the frequency generator 458, with a reset terminal R receiving the 'high' signal, outputs a 'high' signal at its output $\overline{Q}$. Under the 'high' signal from the output $\overline{Q}$, the switch SW is turned ON and the current remover $I_{diacharge}$ removes the electric charge from the capacitor $C_f$.

Removal of the electric charge continuously reduces the voltage $V_{cf}$ to the minimum reference voltage $V_{minref}$, so that the maximum voltage detector 453 outputs a 'low' signal and the minimum voltage detector 455 outputs a 'high' signal.

Upon receiving the 'high' signal at the set terminal S, the frequency generator 458 outputs a 'high' signal at the output Q and a 'low' signal at the output $\overline{Q}$ to turn OFF the switch SW. Thus the capacitor $C_f$ is supplied with an electric charge by the current supply $C_f$ to raise the voltage $V_{cf}$.

When an overcurrent flows through the lamp section 300, as indicated by the dashed line of FIG. 11, the voltage $V_{cf}$ has a waveform in which the voltage varies between the voltage bV and the minimum reference voltage $V_{minref}$. Compared to the waveform under a normal current flowing through the lamp section 300, i.e., the waveform in which the voltage varies between the voltage aV and the minimum reference voltage $V_{minref}$, the frequency has been raised. So, the output Q of the frequency generator 458 generates an on/off waveform having a frequency proportional to the frequency of that waveform.

If an undercurrent flows through the lamp section 300 during the operation of the lamp system, the feedback voltage applied to sense resistor $R_{sense}$ becomes lower than the reference voltage formed at resistor $R_{fb}$ by the current $i_s - i_d$ output from the adder ADD. Thus, the reference voltage comparator 443 supplies a predetermined current from the capacitor $C_{sf}$ and the voltage applied to the voltage selector 451 from the feedback section 440 is cV that is greater than aV.

The voltage selector 451 compares the voltage cV to the reference voltage $V_{ref}$ and exclusively outputs the greater one, i.e., cV, to the maximum voltage detector 453, because the input voltage cV is greater than the reference voltage $V_{ref}$ under an overcurrent flowing through the lamp section 300.

The maximum voltage detector 453 compares the voltage cV to the maximum reference voltage $V_{maxref}$ to select the lower one, i.e., cV, which is then compared with the voltage $V_{cf}$ applied to the capacitor $C_f$.

If the voltage $V_{cf}$ is less than the voltage cV and greater than the minimum reference voltage $V_{minref}$, both the maximum voltage detector 453 and the minimum voltage detector 455 output a 'low' signal and thus the frequency generator 458 maintains the previous output.

As the frequency generator 458 maintains the previous output, the charge supply $I_{charge}$ continues to supply an electric charge to the capacitor $C_f$. When the voltage $V_{cf}$ applied to the capacitor $C_f$ is continuously increased to the voltage cV, the maximum voltage detector 453 outputs a 'high' signal. The voltage $V_{cf}$ is also applied to the inverting terminal of the minimum voltage detector 455 and is greater than the minimum reference voltage $V_{minref}$, so that the minimum voltage detector 455 outputs a 'low' signal.

Upon receiving the 'high' signal from the maximum voltage detector 453 and the 'low' signal from the minimum voltage detector 455, the frequency generator 458, with a reset terminal R receiving the 'high' signal, outputs a 'high' signal at its output $\overline{Q}$. Under the 'high' signal from the output $\overline{Q}$, the switch SW is turned ON and the current remover $I_{diacharge}$ removes the electric charge from the capacitor $C_f$.

Removal of the electric charge continuously reduces the voltage $V_{cf}$ to the minimum reference voltage $V_{minref}$, so that the maximum voltage detector 453 outputs a 'low' signal and the minimum voltage detector 455 outputs a 'high' signal.

Upon receiving the 'high' signal at the set terminal, the frequency generator 458 outputs a 'high' signal at the output Q and a 'low' signal at the output $\overline{Q}$ to turn OFF the switch SW. Thus the capacitor $C_f$ is supplied with an electric charge by the current supply $C_f$ to raise the voltage $V_{cf}$.

When an undercurrent is applied to the lamp section 300, as indicated by the chained line of FIG. 11, the voltage $V_{cf}$ has a waveform in which the voltage varies between the voltage cV and the minimum reference voltage $V_{minref}$. Compared to the waveform under a normal current flowing through the lamp section 300, i.e., the waveform in which the voltage varies between the voltage cV and the minimum reference voltage $V_{minref}$, the frequency has been decreased. So, the output Q of the frequency generator 458 generates an on/off waveform having a frequency proportional to the frequency of that waveform.

The waveform in which the voltage varies between the reference voltage $V_{ref}$ and the minimum reference voltage $V_{minref}$, and the waveform in which the voltage varies between the maximum reference voltage $V_{maxref}$ and the minimum reference voltage $V_{minref}$, as shown in FIG. 11, represent the maximum and minimum voltages applied to the frequency controller 450 when input voltage equals the reference voltage $V_{ref}$ and the maximum reference voltage $V_{maxref}$ is applied to the voltage selector 451, respectively.

If the voltage $V_{csf}$ is equal to the reference voltage $V_{ref}$ due to a factor, the voltage waveform from the capacitor $C_{cf}$ has a frequency varying between the reference voltage $V_{ref}$ and the minimum reference voltage $V_{minref}$ as shown in FIG. 11, in which the frequency of the waveform is the maximum frequency. Therefore, the on/off waveform from the output Q of the frequency generator 458 has the maximum frequency.

If the voltage $V_{csf}$ is equal to the maximum reference voltage $V_{maxref}$ due to a factor, the voltage waveform from the capacitor $C_{cf}$ has a frequency varying between the maximum reference voltage $V_{maxref}$ and the minimum reference voltage $V_{minref}$ as shown FIG. 11, in which the frequency of the waveform is the minimum frequency. Therefore, 974 the on/off waveform from the output Q of the frequency generator 458 has the minimum frequency.

The charging and discharging rates of the capacitor $C_{cf}$ are respectively dependent upon the magnitude of the current supplied and removed by the current supply $I_{charge}$ and the current remover $I_{discharge}$.

Figure 12:
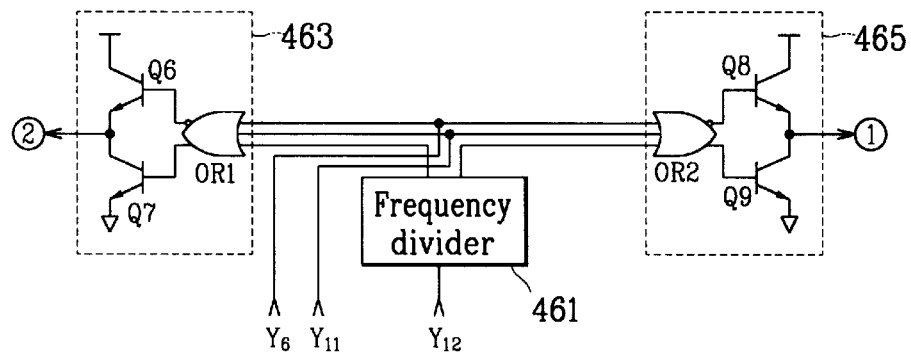
FIG. 12 is a circuit diagram of a switch driver for an embodiment of the present invention.

FIG. 12 is a circuit diagram of the switch driver for the embodiment of the present invention.

As shown in FIG. 12, the switch driver 460 for the embodiment of the present invention changes the direction of the current flowing through the primary coil of the transformer T2 based on the on/off waveform of a predetermined frequency output from the frequency generator 458 of the frequency controller 450. The switch driver 460 includes a frequency divider 461, a first driver 463, and a second driver 465.

The frequency divider 461 includes one input and two outputs. The input is connected to the output Q of the frequency controller 450 for receiving the on/off voltage of a predetermined frequency from the output Q . The frequency divider 461 generates a 'high' signal at one output and a second 'high' signal at the other output.

The first driver 463 includes transistors Q6 and Q7, and a first OR gate OR1. The first OR gate OR1 with a single input connected to one output of the frequency divider 461 includes two outputs, one of which is coupled to the inverter.

The transistor Q6 has a base connected to the output of the inverter, and a collector connected to a driving power source (not shown). The transistor Q7 has a base connected to the other output of the first OR gate OR1, a collector connected to the emitter of the transistor Q6, and an emitter being grounded.

The second driver 465 includes transistors Q8 and Q9, and a second OR gate OR2. The second OR gate OR2 with a single input connected to the other output of the frequency divider 461 includes two outputs, one of which is coupled to the inverter.

The transistor Q8 has a base connected to the output of the inverter, and a collector connected to the driving power source (not shown). The transistor Q9 has a base connected to the other output of the second OR gate OR2, a collector connected to the emitter of the transistor Q8, and an emitter being grounded.

Now, a description will be given as to the operation of the switch driver 460 with reference to FIG. 12.

When the frequency generator 458 outputs an on/off signal having a predetermined frequency based on the current flowing through the lamp section 300, the frequency divider 461 has one output generate a 'high' signal to the first driver 463, and the other output generate a second 'high' signal to the second driver 465 based on the on/off signal having the predetermined frequency.

Upon receiving the 'high' signal, the first OR gate OR1 outputs a 'high' signal at one output and a 'low' signal at the other output coupled to the inverter, to turn the transistor Q6 OFF and the transistor Q7 ON.

As the first OR gate OR1 receives the 'high' signal, the second OR gate OR2 receives no signal with the same effect as it receives a 'low' signal. Thus the second OR gate OR2 outputs a 'low' signal at one output and a 'high' signal at the other output coupled to the inverter, to turn the transistor Q8 ON and the transistor Q9 OFF.

Therefore, the current flowing through the primary coil of the transformer T2 of the current controller 200 has a direction in the order of transistor Q8, transformer T2 and transistor Q7.

If a second 'high' signal is fed into the second OR gate OR2 of the second driver 465 via the frequency divider 461, the current flowing through the primary coil of the transformer T2 has a direction in the order of transistor Q6, transformer T2 and transistor Q9.

The current flowing through the primary coil of the transformer T2 is coupled to the predetermined frequency output from the frequency controller 450, so that the current controller 200 is coupled to the frequency to control the magnitude of the current.

Figure 13:
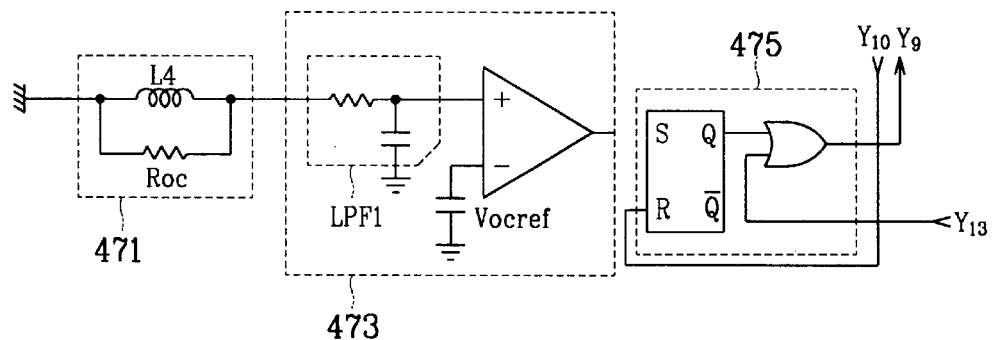
FIG. 13 is a circuit diagram of an overcurrent protector for an embodiment of the present invention.

FIG. 13 is a circuit diagram of the overcurrent protector for the embodiment of the present invention.

As shown in FIG. 13, the overcurrent protector 470 for the embodiment of the present invention detects an overcurrent of a magnitude greater than a predetermined value that flows through the lamp section 300 to protect the lamp section 300. The overcurrent protector 470 includes an overcurrent detector 471, an overcurrent determiner 473, and a fourth shutdown section 475.

The overcurrent detector 471 includes an inductor L4 for generating a voltage based on the current flowing to the inductor L3, and an overcurrent detecting resistor $R_{oc}$ connected to both terminals of the inductor L4 for detecting a voltage generated.

The overcurrent determiner 473 compares the detected voltage of the overcurrent detecting resistor $R_{oc}$ to an overcurrent detecting reference voltage $V_{ocref}$ to determine whether the detective voltage of the overcurrent detecting resistor $R_{oc}$ is a voltage generated by the overcurrent. The overcurrent determiner 473 has the non-inverting terminal of the comparator connected to a low pass filter LPF1 so that it removes a high-frequency component from the signal applied to the overcurrent detector 471 to accurately detect the overcurrent.

The fourth shutdown section 475 interrupts the current applied to the lamp section 300 when the overcurrent determiner 473 outputs a signal indicating an input of the overcurrent. For this purpose, the fourth shutdown section 475 includes a latch with a set terminal connected to the output of the overcurrent determiner 473, so that the latch outputs a 'high' signal to interrupt the current flowing through the lamp section 300 when the overcurrent determiner 473 outputs a 'high' signal upon detection of the overcurrent.

Figure 14:
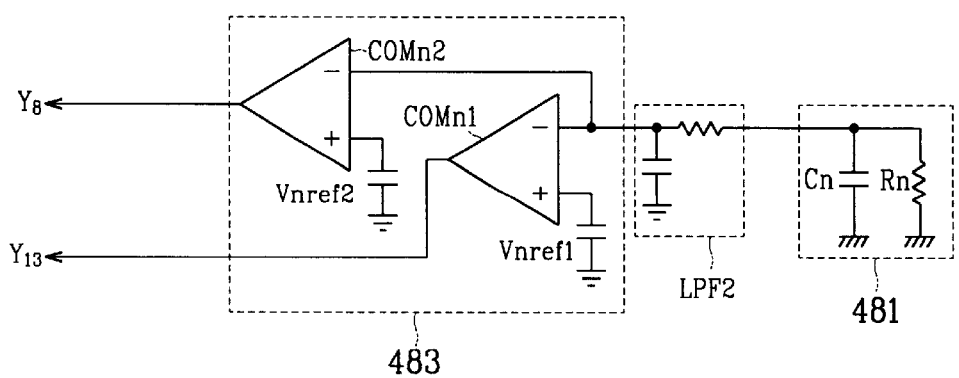
FIG. 14 is a circuit diagram of a lamp selector for an embodiment of the present invention.

FIG. 14 is a circuit diagram of the lamp selector for the embodiment of the present invention.

As shown in FIG. 14, the lamp selector 480 for the embodiment of the present invention is to control the magnitude of the current output from the adder ADD depending on whether the lamp section 300 includes one lamp or two lamps. The lamp selector 480 includes a lamp number detector 481, and a reference voltage regulator 483.

The lamp number detector 481 determines the number of lamps in the lamp section 300 and forms a voltage caused by the current flowing through the lamps. The lamp number detector 481 includes a resistor $R_n$ connected to the common terminal of the capacitors C18 and C19, and the common terminal of the capacitors Q20 and Q21 for forming a voltage by the magnitude of the current varying depending on the number of lamps of the lamp section 300, and a capacitor $C_n$ connected in parallel to the resistor $R_n$ for charging/discharging an electric charge coupled to the voltage that is applied to the resistor $R_n$.

The reference voltage regulator 483 regulates the reference voltage of the feedback section 440 in a manner such that it interrupts the current applied to the lamp section 300 when there is no lamp, diminishes the current output from the adder ADD by half when the lamp section 300 has one lamp, and maintains the current output from the adder ADD when the lamp section 300 has two lamps. The reference voltage regulator 483 includes comparators COMn1 and COMn2.

The comparator COMn1 has an inverting terminal connected to the common terminal of the resistor $R_n$ and the capacitor $C_n$ of the lamp number detector 481, and a non-inverting terminal connected to a first regulating voltage $V_{nref1}$.

The comparator COMn2 has an inverting terminal connected to the non-inverting terminal of the comparator COMn1, and a non-inverting terminal connected to a second regulating voltage $V_{nref2}$.

The first regulating voltage $V_{nref1}$ is less than the second regulating voltage $V_{nref2}$.

Now, a description will be given as to the operation of the lamp selector 480 with reference to FIG. 14.

When the lamp section 300 has one lamp, the voltage applied to the lamp number detector 481 falls between the first regulating voltage $V_{nref1}$ and the second regulating voltage $V_{nref2}$. Upon receiving the voltage output from the lamp number detector 481, the comparators COMn1 and COMn2 output a 'low' signal and a 'high' signal, respectively.

Under the 'high' signal of the comparator COMn2, only half of the current output from the adder ADD is applied to the resistor $R_{fb}$ of the feedback section 440 to reduce the magnitude of the reference voltage.

When the lamp section 300 has two lamps, the voltage applied to the lamp number detector 481 is equal to or greater than the second regulating voltage $V_{nref2}$. Upon receiving the voltage output from the lamp number detector 481, both the comparators COMn1 and COMn2 output a 'low' signal.

Under the 'low' signal of the comparator COMn2, the current output from the adder ADD is applied to the resistor $R_{fb}$ of the feedback section 440 to form the reference voltage.

When the lamp section 300 has no lamp, the voltage applied to the lamp number detector 481 is less than the first regulating voltage $V_{nref1}$. Upon receiving the voltage output from the lamp number detector 481, the comparator COMn1 outputs a 'high' signal to stop the operation of the switch driver 460 and thereby to interrupt the current supply to the lamp section 300.

Now, a description will be given as to the shutdown controller 490 with reference to FIG. 10.

As shown in FIG. 10, the shutdown controller 490 is to interrupt the current applied to the lamp section 300 when at least one of the second, third and fourth shutdown sections 435, 459 and 475 outputs a 'high' signal. The shutdown controller 490 includes a general OR gate, which has an input connected to the outputs of the second, third and fourth shutdown sections 435, 459 and 475, and an output connected to the first and second OR gates OR1 and OR2 of the switch driver 460.

Now, a description will be given as to the operation of the shutdown controller 490 with reference to the accompanying drawings.

The shutdown controller 490 outputs a 'high' signal to the first and second drivers 463 and 465 when at least one of the second, third and fourth shutdown sections 435, 459 and 475 outputs a 'high' signal during the operation of the lamp system.

Upon receiving the 'high' signal from the shutdown controller 490, the first and second drivers 463 and 465 output a 'low' signal to the bases of the transistors Q6 and Q8 to turn OFF the transistors Q6 and Q8, and a 'high' signal to the transistors Q7 and Q9 to turn ON the transistors Q7 and Q9. This interrupts the current supply to the primary coil of the transformer T2 of the current controller 200 to prevent the current from being applied to the lamp section 300.

The ballast 400 controls the lamp system in that it forms a feedback voltage using the current applied to the lamp section 300 to control the frequency of the signal fed into the current controller 200 depending on the magnitude of the feedback voltage.

Figure 15:
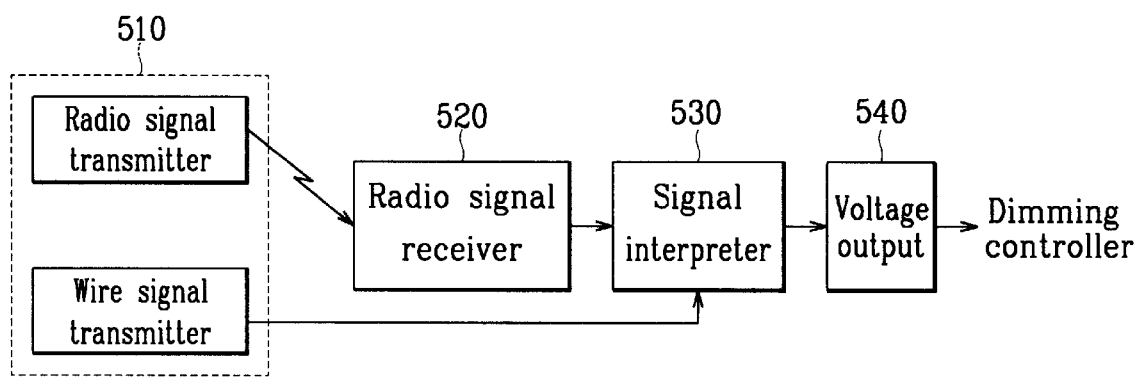
FIG. 15 is a block diagram of a dimming voltage controller according to an embodiment of the present invention.

FIG. 15 is a block diagram of the dimming voltage controller according to an embodiment of the present invention.

As shown in FIG. 15, the dimming voltage controller 500 is to supply a dimming voltage $V_{dm}$ to the dimming controller 430 in order for the user to regulate the intensity of the light emitted from the lamp. The dimming voltage controller 500 includes a signal transmitter 510, a radio signal receiver 520, a signal interpreter 530, and a dimming voltage output 540.

The signal transmitter 510 transmits a signal to control the lamp system, for example, to regulate the on/off operation of the lamp system or the intensity of the light. The signal transmitter 510 may be a radio signal transmitter or a wire signal transmitter.

The radio signal receiver 520 receives the output signal of the signal transmitter 510 that is a radio signal transmitter.

The signal interpreter 530 receives the output signal of the radio signal receiver 520 when the signal transmitter 510 is a radio signal transmitter, or the output signal of the wire signal transmitter when the signal transmitter 510 is a wire signal transmitter, and interprets the control content of the lamp system including the on/off operation of the lamp and the intensity of the light.

The dimming voltage output 540 is coupled to the output signal of the signal interpreter 530 to generate a dimming voltage $V_{dm}$ in a predefined range. The dimming voltage $V_{dm}$ from the dimming voltage output 540 has a magnitude in the range between 0 V to the soft dimming reference voltage $V_{sdref}$.

Now, a description will be given in detail as to the operation of the lamp system with an electronic ballast according to the embodiment of the present invention with reference to FIGS. 16 and 17.

Figure 17:
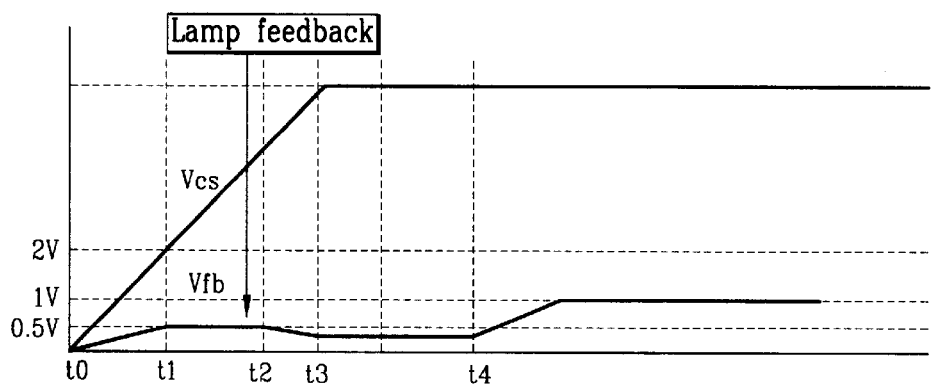
FIG. 17 is a waveform diagram of a reference voltage during the operation of the lamp system according to an embodiment of the present invention.

FIG. 16 is an overall circuit diagram of the ballast illustrating the lamp system according to the embodiment of the present invention, and FIG. 17 is a waveform diagram of a reference voltage in the lamp system.

When an AC power is supplied to the power-factor compensator 100 of the lamp system, the power-factor compensator 100 rectifies the AC power and improves the power factor of the rectified AC power to supply the power to the current controller 200 and the ballast 400.

During the initial start operation of the system, the power supply voltage $V_s$ gives a charge of electricity to the capacitor C1. If the voltage applied to the capacitor C1 is less than the undervoltage reference voltage $V_u$, the undervoltage detector 413 outputs a 'low' signal to sink the electric charge accumulated in the soft capacitor $C_s$ of the soft start section 420 to ground, thereby holding off the operation of the entire system.

Subsequently, the voltage applied to the capacitor C1 continues being increased to exceed the undervoltage reference voltage $V_u$, so that the undervoltage detector 413 outputs a 'high' signal to turn OFF the first shutdown section to start the charging operation of the soft capacitor $C_s$ and hence the soft start of the entire system. This time is indicated by t0 of FIG. 9(a).

When the start-up of the entire system actuates the current controller 200 to turn the switch Q2 ON and the switch Q3 OFF, the current supplied by the current controller 200 is charged in the capacitor C2, and if it is discharged completely, it is charged again in the reverse direction of the previous charging in the capacitor C2 via the lamp section 300 and the diode D3. With diode D3 OFF and diode D2 ON, the operation maintenance voltage formed at the capacitor C2 is applied to the undervoltage detector 413.

If the voltage applied to the non-inverting terminal of the undervoltage detector 413 is greater than the undervoltage reference voltage $V_u$, the undervoltage detector 413 outputs a 'high' signal to turn on the switch 416 and the voltage applied to the non-inverting terminal forms an aV reference voltage $V_{ref}$ and an interval bias voltage via the switch 416.

If an ignition voltage greater than the undervoltage reference voltage $V_u$ is applied to the non-inverting terminal of the undervoltage detector 413, an electric charge is accumulated in the start voltage generator $C_s$ to form a start voltage $V_{cs}$.

The start voltage generator $C_s$ gradually increases the start voltage $V_{cs}$, as shown in FIG. 17. Thus the ignition voltage applied does not immediately actuate the entire system but permits the start voltage generator $C_s$ to gradually form the start voltage $V_{cs}$, thus alleviating the shock on the entire system.

The start voltage $V_{cs}$ is gradually increased from zero as the first current supply $I_1$ gives an electric charge to the start voltage generator $C_s$, at the early stage where the start voltage generator $C_s$ hardly has residual charge, so that the first current amplifier AMP1 selects the start voltage $V_{cs}$.

The voltage applied to the inverting terminal of the first current amplifier AMP is the selected start voltage $V_{cs}$, so that one terminal of the current mirror CM1 outputs a current as represented by Equation 2 to the resist $R_{ss}$ and the other terminal also outputs a current $i_s$ of the same magnitude.

As the current output from the other terminal of the current mirror CM1 flows through the resistor $R_{fb}$ via the adder ADD, the reference voltage of the feedback section 440 also increases with a predetermined slope until the time t1 as shown in FIG. 17 when no current is applied to the adder ADD from the dimming controller 430.

The first current amplifier AMP1 exclusively outputs the soft start reference voltage $V_{sref}$ to the resistor $R_{ss}$ at the time when the start voltage $V_{cs}$ is gradually increased to exceed the soft start reference voltage $V_{sref}$ after t1. Thus the current flowing through the resistor $R_{ss}$ has a magnitude as given by Equation 3, and a current $i_s$ of the same magnitude as given by Equation 3 is output at the other terminal of the current mirror CM1. Consequently, the reference voltage formed at the resistor $R_{ss}$ of the feedback section 440 has a predetermined magnitude as shown in FIG. 17.

The start voltage $V_{cs}$, which increases when the soft start begins, is also applied to the dimming reference voltage generator AMP2. If the start voltage $V_{cs}$ is greater than the dimming starting reference voltage $V_{dsref}$ to supply an electric charge to the dimming power supply $C_{dm}$, this completed the preparation for dimming control.

When the user operates the radio signal transmitter or the wire signal transmitter of the signal transmitter 510 at t2 in order to provide a desired brightness of the lamp, the output signal of the radio signal transmitter is fed into the signal interpreter 530 via the radio signal receiver 520, or the output signal of the wire signal transmitter is directly fed into the signal interpreter, depending on which method is used. The signal interpreter 530 interprets the input signal to output a dimming voltage $V_{dm}$ corresponding to the user's desired brightness of the lamp to the dimming controller 430 via the dimming voltage output 540.

Under the dimming voltage $V_{dm}$ with an electric charge accumulated in the dimming power supply $C_{dm}$, the dimming reference voltage generator AMP2 compares the dimming voltage $V_{dm}$ to the soft dimming reference voltage $V_{sdref}$ and applies the lower one to the resistor $R_{dm}$. The amount of electric charge accumulated in the dimming power supply $C_{dm}$ is determined by the sum of the voltage between the emitter and the base of the transistor Q5 and the voltage applied to the resistor $R_{dm}$.

If the dimming voltage $V_{dm}$ is less than the soft dimming reference voltage $V_{sdref}$, the current flowing through the resistor $R_{dm}$ via the second current mirror has a magnitude $i_{dr}$ as given by Equation 4.

Thus the other output of the second current mirror outputs a current $i_d$ of the same magnitude as the current $i_{dr}$ to the adder ADD. The adder ADD subtracts the current $i_d$ from a current $i_s$ at the other output of the first current mirror CM1, and sends the result to the resistor $R_{fb}$ of the feedback section 440. The current $i_d$ increases gradually due to the time delay of the dimming power supply $C_{dm}$, so that the reference voltage is not suddenly changed but is gradually reduced, as shown in FIG. 17.

The feedback section 440 compares the gradually decreasing reference voltage to the feedback voltage $V_{fb}$ and removes a predetermined amount of electric charge from the start frequency generator $C_s$, judging that an excess of current flows through the lamp section 300. The voltage $V_{csf}$ at this time is less than the voltage in the interval between t1 and t2 and greater than the reference voltage $V_{ref}$, so that the voltage selector 451 exclusively outputs the greater voltage, i.e., $V_{csf}$ in the interval between t1 and t2 to the inverting terminal of the maximum voltage detector 453.

The voltage $V_{cf}$ applied to the charger $C_f$ has a saw-toothed waveform in which the voltage varies between the voltage $V_{csf}$ and the minimum reference voltage $V_{minref}$. The frequency of the waveform is greater than that of the voltage waveform formed in the interval between t1 and t2, so that the frequency generator 458 forms the higher frequency.

Consequently, both the switch driver 460 and the current controller 200 are operated in connection to the frequency of the frequency generator 458 such that the magnitude of the current applied to the lamp section 300 is reduced to a desired level.

When the lamp section 300 has one lamp before t4, the comparators COMn1 and COMn2 output a 'low' signal and a 'high' signal, respectively, upon receiving the output voltage from the lamp number detector 481. Thus only half of the current output from the adder ADD is applied to the resistor $R_{fb}$ of the feedback section 440 to reduce the magnitude of the reference voltage.

Contrarily, when the lamp section 300 has two lamps after t4, the voltage applied to the lamp number detector 481 is equal to or greater than the second regulating voltage $V_{nref2}$. Upon receiving the voltage output from the lamp number detector 481, both the comparators COMn1 and COMn2 output a 'low' signal.

Under the 'low' signal of the comparator COMn2, the current output from the adder ADD is applied to the resistor $R_{fb}$ of the feedback section 440 to form a reference voltage higher than the reference voltage when the lamp section 300 has one lamp. The reference voltage is gradually increased because of the capacitor $C_n$ in the lamp number detector 481.

If an overcurrent flows through the lamp section 300 to increase the feedback voltage $V_{fb}$, the reference voltage comparator 443 subtracts a current of a predetermined magnitude from the capacitor $C_{sf}$ to drop the voltage applied to the capacitor $C_{sf}$. When a voltage $V_{csfoc}$ is applied to the voltage selector 451 and it is less than the reference voltage $V_{ref}$, the voltage applied to the capacitor $C_{sf}$ has a saw-toothed waveform in which the voltage varies between the voltage $V_{csfoc}$ and the minimum reference voltage $V_{minref}$.

If the voltage applied to the capacitor $C_{sf}$ prior to an input of the overcurrent, i.e., when a normal current flows through the lamp section 300 is $C_{csfnc}$, the voltage $V_{cf}$ applied to the capacitor $C_f$ has a saw-toothed waveform in which the voltage varies between the voltage $V_{csfnc}$ and the minimum reference voltage $V_{minref}$. Thus the frequency is highest when the overcurrent flows through the lamp system.

Accordingly, the switch driver 460 operates with the higher frequency than in the normal operation to reduce the magnitude of the current input to the lamp section 300 and thereby to regulate the overcurrent to a normal current.

If an undercurrent flows through the lamp section 300 to reduce the feedback voltage $V_{fb}$, the reference voltage comparator 443 supplies the current of a predetermined magnitude to the capacitor $C_{sf}$ to raise the voltage applied to the capacitor $C_{sf}$. When the voltage applied to the capacitor $C_{sf}$ is $V_{csfuc}$, which is applied to the voltage selector 451 and is greater than the reference voltage $V_{ref}$, the voltage selector 451 exclusively outputs the voltage $V_{csfuc}$ to the inverting terminal of the maximum reference voltage detector 453.

Thus the voltage $V_{cf}$ applied to the capacitor $C_f$ has a saw-toothed waveform in which the voltage varies between the voltage $V_{csfuc}$ and the minimum reference voltage $V_{minref}$. The frequency of this saw-toothed waveform is lower than the frequency formed when a normal current is applied to the lamp section 300, because the voltage $V_{cf}$ applied to the capacitor $C_f$, which is under the normal current flowing through the lamp section 300, has a saw-toothed waveform in which the voltage varies between the voltage less than $V_{csfuc}$ and the minimum reference voltage $V_{minref}$.

Accordingly, the frequency generator 458 provides an on/off waveform coupled to the frequency of the saw-toothed waveform in which the voltage varies between the voltage $V_{csfuc}$ and the minimum reference voltage $V_{minref}$.

The switch driver 460 coupled to the frequency of the received on/off waveform operates the current controller 200 to increase the magnitude of the current fed into the lamp section 300.

If a current that may damage the lamp section 300 flows through the lamp section 300 during the operation of the lamp system due to a factor, a voltage is induced at the coil L4 of the overcurrent detector 471 and is applied to the non-inverting terminal of the overcurrent determiner 473, which then compares the induced voltage to an overcurrent reference voltage $V_{ocref}$. If voltage applied to the non-inverting terminal is less than the overcurrent reference voltage $V_{ocref}$, the fourth shutdown section 475 stops the operation of the switch driver 460 to prevent any damage to the lamp system.

When the lamp section 300 has no lamp, the voltage applied to the lamp selector 480 is less than the first regulating voltage $V_{nref1}$ and the comparator COMn1 outputs a 'high' signal to stop the operation of the switch driver 460 and thereby to interrupt the current supply to the lamp section 300.

Meanwhile, when the user sends an off signal of the lamp system via the signal transmitter 510, the signal interpreter 530 outputs a voltage of the same magnitude as the soft dimming reference voltage $V_{sdref}$ to the dimming voltage $V_{dm}$.

When the dimming reference voltage generator AMP2 applies the soft dimming reference voltage $V_{sdref}$ to the resistor $R_{dm}$, the current output to one terminal of the second current mirror CM2 is the same in magnitude as the current output from the soft starter 420, thus generating no current from the adder ADD. Thus the reference voltage comparator 443 of the feedback section 440 continuously subtracts the current from the capacitor $C_{sf}$ to stop the operation of the lamp section 300.

The lamp system with an electronic ballast according to the present invention feeds back the current of the load to control the lamp.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the lamp system with an electronic ballast according to the present invention uses a feedback closed control to operate the lamp regardless of the change in the frequency that may occur due to errors of the elements.

What is claimed is:

1. In a ballast using a lamp system comprising a power supply for supplying power; a current controller for providing a controlled current, the current controller including a switch to control the magnitude of the power, the switch having an on/off state; a lamp section having at least one lamp for emitting light using the controlled current from the current controller, and a ballast comprising:

an undervoltage protector for preventing a malfunction of the entire system, and generating an initial operating signal of the entire system upon receiving a voltage of less than a voltage capable of operating the entire system;

a soft starter for gradually increasing a soft start voltage to a predetermine level to proceed with a start-up of the lamp upon receiving an initial operating signal from the undervoltage protector;

a dimming controller for gradually increasing a voltage for dimming control even when an externally input dimming signal is changed in order to regulate the light intensity;

a feedback section for forming a feedback voltage based on the magnitude of the current flowing through the lamp, comparing the feedback voltage with a reference voltage formed based on output signals from the soft starter and the dimming controller to perform the soft start and soft dimming operations of the lamp, and determining whether the current flowing through the lamp is an overcurrent, an undercurrent, or a normal current;

a frequency controller for generating first and second frequencies for regulating the magnitude of the current input to the lamp based on a received signal from the feedback section, whereby the frequency controller generates the first frequency when the feedback voltage is greater than the reference voltage, the second frequency being generated when the feedback voltage is less than the reference voltage; and a switch driver coupled to the first and second frequencies to control the on/off state of the switch of the current controller.

2. The ballast as claimed in claim 1, wherein the ballast further comprises an overcurrent protector for stopping the operation of the switch driver upon detection of an overcurrent input to the lamp section, wherein the overcurrent is greater than a predetermined current level.

3. The ballast as claimed in claim 1, wherein the ballast further comprises a lamp selector for detecting the current at the lamp section, the current varying depending on the number of lamps, to change the magnitude of the reference voltage of the feedback section.

4. The ballast as claimed in claim 1, wherein the undervoltage protector comprises:

an ignition and operating voltage section for forming an ignition voltage for starting the entire system using a current from the power supply upon receiving a start signal of the entire system, and then forming an operation maintenance voltage for maintaining the operation of the entire system using a current from the current controller; and an undervoltage detector for comparing a voltage received from the ignition and operating voltage section to an undervoltage reference voltage, whereby the undervoltage detector holds off the start-up of the entire system upon receiving a voltage of less than the ignition voltage.

5. The ballast as claimed in claim 1, wherein the undervoltage protector further comprises a first shutdown section coupled to an output signal of the undervoltage detector, whereby the first shutdown section prevents the formation of a start voltage of the soft starter upon receiving a voltage of less than the ignition voltage.

6. The ballast as claimed in claim 5, wherein the soft starter comprises:

a first current supply for supplying an electric charge;

a start voltage generator coupled to the output signal of the undervoltage detector to turn off the first shutdown section upon receiving the ignition voltage from the ignition and operating voltage section, and then coupled to the electric charge supplied from the first current supply, whereby the start voltage generator forms a gradually increasing start voltage;

a start reference voltage generator coupled to the start voltage that is gradually increased to a predetermined voltage, whereby the start reference voltage generator forms a gradually increasing reference voltage to be input to the feedback section; and a start frequency generator coupled to the start voltage applied to the start voltage generator during the initial operation of the entire system, whereby the start frequency generator outputs a signal for forming a start frequency from the frequency controller during the initial operation of the entire system.

7. The ballast as claimed in claim 6, wherein the dimming controller comprises:

a dimming starter for comparing the start voltage formed at the start voltage generator with a dimming starting reference voltage, and performing dimming control by supplying an electric charge when the start voltage is greater than the dimming starting reference voltage; and a soft dimmer being coupled to an externally input dimming signal to form a voltage for determining the amount of electric charge accumulated in the dimming starter, the soft dimmer generating a reference voltage for soft dimming when the dimming signal is changed in order to regulate the intensity of the light from the lamp section, whereby a voltage applied to the dimming starter is gradually varied by a time delay of the dimming starter during soft dimming.

8. The ballast as claimed in claim 7, wherein the ballast further comprises a second shutdown section for stopping the operation of the switch driver upon receiving a dimming signal being greater than the predetermined voltage.

9. The ballast as claimed in claim 1, wherein the feedback section comprises:

a feedback voltage generator for generating a feedback voltage using the current flowing through the lamp section; and a reference voltage comparator receiving the feedback voltage from the feedback voltage generator, and the output signals from the soft starter and the dimming controller to form a reference voltage during the operation of the lamp, and comparing the feedback voltage to the reference voltage to determine whether the current flowing through the lamp section is an overcurrent, an undercurrent, or a normal current relative to the reference voltage, the determination result being output to the frequency controller.

10. The ballast as claimed in claim 2, wherein the overcurrent protector comprises:

an overcurrent detector for generating a voltage coupled to the current flowing through the current controller;

an overcurrent determiner for comparing the detected voltage from the overcurrent detector to an overcurrent detecting reference voltage to determine whether the detected voltage from the overcurrent detector is generated from an overcurrent; and a fourth shutdown section for stopping the operation of the switch driver upon receiving a signal from the overcurrent determiner indicating that an overcurrent is input.

11. The ballast as claimed in claim 10, wherein the overcurrent determiner further comprises a first low pass filter for removing a high-frequency component from the detected voltage of the overcurrent detector.

12. The ballast as claimed in claim 6, wherein the frequency controller comprises:

a voltage selector for receiving an initial voltage from the start frequency generator of the soft starter during the initial soft start, and comparing the reference voltage to a voltage output from the feedback section at the time when the current flows through the lamp section after an elapse of time;

a comparative voltage generator for generating a comparative voltage to facilitate triggering of an on/off signal and having a predetermined frequency;

a maximum voltage detector for selecting the lower one of the output of the voltage selector and a maximum reference voltage to detect the maximum voltage to which the comparative voltage can be raised during the operation of the lamp section;

a minimum voltage detector for comparing a minimum reference voltage to the comparative voltage to detect the minimum voltage to which the comparative voltage can be dropped; and a frequency generator for generating a signal coupled to the frequencies of the outputs of the maximum voltage detector and the minimum voltage detector.

13. The ballast as claimed in claim 12, wherein the frequency generator further comprises a third shutdown section for stopping the operation of the switch driver when the comparative voltage formed at the comparative voltage generator is less than a predetermined voltage.

14. The ballast as claimed in claim 12, wherein the comparative voltage generator comprises:

a charger for accumulating an electric charge;

a charge supply for supplying the electric charge to the charger;

a charge remover for removing the electric charge from the charger; and a switch being switched upon receiving the output signal of the frequency generator to operate the charge remover.

15. The ballast as claimed in claim 12, wherein the switch driver comprises:

a frequency divider including two outputs and receiving an on/off signal having a predetermined frequency from the frequency generator, whereby the frequency divider outputs x signal at one output and x+1 signal at the other output;

a first driver connected to one output of the frequency divider and driven upon receiving x signal; and a second driver connected to the other output of the frequency divider and driven upon receiving x+1 signal.

16. The ballast as claimed in claim 3, wherein the lamp selector comprises:

a lamp number detector for detecting a voltage, varying depending on the number of lamps, coupled to the current of the lamp section; and a reference voltage regulator for comparing the detected voltage from the lamp number detector to the N regulating voltage (where N is a natural number) to detect the M regulating voltage and the (M+1) regulating voltage (where M is a natural number from 1 to M) indicating the positions of the detected voltages of the lamp number detector, whereby the reference voltage regulator reduces the reference voltage of the feedback section coupled to the M regulating voltage.

17. The ballast as claimed in claims 8, further comprising a shutdown controller for receiving the output signals of the second shutdown sections, and stopping the operation of the switch driver when at least one of the output signals of the second shutdown section is a shutdown signal.

18. The ballast as claimed in claim 1, wherein the undervoltage protector comprises:

an ignition and operating voltage section including a first capacitor, a second capacitor, a first diode, a third capacitor, a fourth capacitor and a second diode, one terminal of the first capacitor being connected to the output of the power supply, one terminal of the second capacitor being connected to the current controller, the anode of the first diode being connected to the other terminal of the second capacitor, the cathode of the first diode being connected to one terminal of the first capacitor, the cathode of the second diode being connected to a common terminal coupled to the other terminal of the second capacitor and the anode of the first diode, the anode of the second diode being connected to a common terminal coupled to the third capacitor and the fourth capacitor;

an undervoltage detector including a comparator, the comparator having a first polar input connected to the cathode of the first diode of the ignition and operating voltage section, and a second polar input opposite to the first polar input in polarity and connected to an undervoltage reference voltage; and a first shutdown section including a transistor, the base of the transistor being connected to the output of the comparator, the emitter of the transistor being grounded, the collector of the transistor being connected to the start voltage generator.

19. The ballast as claimed in claim 18, wherein the ignition and operating voltage section further comprises a Zener diode, a cathode of the Zener diode being connected to one terminal of the first capacitor, and another terminal of the Zener diode being grounded.

20. The ballast as claimed in claim 18, wherein the comparator comprises a Schmidt trigger circuit.

21. The ballast as claimed in claim 1, wherein the soft starter comprises:
   a first current supply for supplying an electric charge;
   a start voltage generator including a fifth capacitor, one terminal of the fifth capacitor being connected to one terminal of the first current supply, the other terminal of the fifth capacitor being grounded;
   a start reference voltage generator including a comparator, a first switch, a first controlled current source, a second switch, and a second controlled current source, the comparator having a first polar input connected to a common terminal coupled to the fifth capacitor and the first current supply and a second polar input connected to a soft start reference voltage, the first switch being turned on when the comparator outputs a 'high' signal, the second switch being turned on when the comparator outputs a 'low' signal, one terminal of the first controlled current source being connected to the first switch to turn on the first switch upon receiving a 'high' signal from the comparator and thereby to generate a current having a magnitude of $G_1 \times V_{cs}$, where $G_1$ defines a first conductance, one terminal of the second controlled current source being connected to the second switch to turn on the second switch upon receiving a 'low' signal from the comparator and thereby to generate a current having a magnitude of $G_2 \times V_{sref}$, where $G_2$ defines a second conductance; and
   a start frequency generator including a first transistor, a third diode, and a sixth capacitor, a base of the first transistor being connected to a common terminal coupled to the first current supply and the start voltage generator, a collector of the first transistor being grounded, a cathode of the third diode being connected to an emitter of the first transistor and one terminal of the sixth capacitor being connected to an anode of the third diode.

22. The ballast as claimed in claim 21, wherein the start frequency generator further comprises a fourth diode, an anode of the fourth diode being connected to the cathode of the third diode, a cathode of the fourth diode being connected to the emitter of the first transistor.

23. The ballast as claimed in claim 1, wherein the soft starter comprises:
   a first current supply for supplying an electric charge;
   a start voltage generator including a fifth capacitor, one terminal of the fifth capacitor being connected to one terminal of the first current supply the other terminal of the fifth capacitor being grounded;
   a first current amplifier having two first polar inputs and a second polar input opposite to the first polar inputs in polarity, one first polar input of the first current amplifier being connected to a common terminal coupled to the first current supply and the start voltage generator, the other first polar input of the first current amplifier being coupled to an anode of a soft start reference voltage, the second polar input being connected to one terminal of a first resistor, whereby the first current amplifier selects the lower one of the input signals of the two first polar inputs and applies the selected signal to the second polar input;
   a second transistor having a base connected to the output of the first current amplifier, and an emitter connected to one terminal of the first resistor; and
   a first current mirror of which a first terminal is connected to the emitter of the second transistor and a second terminal of the first current mirror is connected to the feedback section.

24. The ballast as claimed in claim 23, wherein the dimming controller comprises:
   a dimming starter including a dimming starting detector, and a time delay, the dimming starting detector having a first polar input connected to a common terminal coupled to the first current supply and the start voltage generator, and a second polar input opposite to the first polar input in polarity and connected to the anode of the dimming starting reference voltage, one terminal of the time delay being connected to the output of the dimming starting detector the other terminal of the time delay being grounded; and
   a soft dimmer including a dimming reference voltage generator, a second resistor, a third transistor, and a second current mirror, one first polar input of the dimming reference voltage generator being connected to a dimming voltage for regulating the light intensity of the lamp section, the other first polar input of the dimming reference voltage generator being connected to the anode of a soft illuminating reference voltage, whereby the dimming reference voltage generator selects the lower one of the input signals of the two first polar inputs and applies the selected signal to a second polar input opposite to the first polar inputs in polarity, the second resistor being connected to the second polar input of the dimming reference voltage generator to receive the selected voltage from the dimming reference voltage generator, the base of the third transistor being connected to the output of the dimming reference voltage generator, the emitter of the third transistor being connected to a common terminal coupled to the second resistor and the dimming reference voltage generator, whereby the third transistor provides a path for the current flowing through the second resistor when the selected voltage of the dimming reference voltage generator is applied to the second resistor, one output of the second current mirror being connected to the collector of the third transistor so that the second current mirror generates, at its two outputs, a current of the same magnitude as the current flowing through the second resistor the first terminal of the adder being connected to the other output of the first current mirror, the second terminal of the adder being connected to the other output of the second current mirror, the third terminal of the adder being connected to the feedback section, whereby the adder subtracts the output current of the second current mirror from the output current of the first current mirror and outputs the result to the feedback section.

25. The ballast as claimed in claim 24, wherein the dimming controller further comprises a second shutdown section having a first polar input connected to the dimming voltage and a second polar input being opposite to the first polar input in polarity and connected to a second shutdown reference voltage whereby the second shutdown section compares the dimming voltage to a second shutdown reference voltage and stops the operation of the switch driver.

26. The ballast as claimed in claim 24, wherein the feedback section comprises:
   a feedback voltage generator including a sense resistor and a feedback capacitor, one terminal of the sense resistor being connected to the lamp section, whereby the sense resistor detects the magnitude of the current output from the lamp section, one terminal of the feedback capacitor being connected to one terminal of the sense resistor, the other terminal of the feedback capacitor being grounded, whereby the feedback capacitor accumulates an electric charge of as much as the voltage applied to the sense resistor; and a reference voltage comparator having a first polar input connected to a common terminal coupled to a third resistor and the adder, and a second polar input opposite to the first polar input in polarity and connected to a common terminal coupled to the sense resistor and the feedback capacitor, whereby the reference voltage comparator compares a feedback voltage applied to the sense resistor to a reference voltage applied to the third resistor, and adds/removes the current to/from the feedback capacitor.

27. The ballast as claimed in claim 26, wherein the frequency controller comprises:

a voltage selector of which one first polar input is connected to the output of the reference voltage comparator of the feedback section, the other first polar input being connected to the reference voltage, the output of the voltage selector being connected to a second polar input opposite to the first polar inputs in polarity, whereby the voltage selector selects the greater one of the voltages applied to the two first polar inputs;

a maximum voltage detector of which one second polar input is connected to the output of the voltage selector, the other second polar input being connected to a maximum reference voltage;

a minimum voltage detector having a first polar input connected to a minimum reference voltage, and a second polar input opposite to the first polar input in polarity and connected to the first polar input of the maximum voltage detector;

a comparative voltage generator including a charger, a charge supply, a current remover, and a third switch, one terminal of the charger being connected to the first polar input of the maximum voltage detector, whereby the charger accumulates/discharges an electric charges, one terminal of the charge supply being connected to one terminal of the charger, whereby the charge supply supplies an electric charge to the charger, one terminal of the current remover being connected to a common terminal coupled to the charge supply and the charger whereby the current remover removes the electric charge, one terminal of the switch being connected to the other terminal of the current remover, the other terminal of the switch being grounded, whereby the current remover discharges the electric charge from the charger when the third switch is turned ON; and a frequency generator including an SR latch having a set terminal S connected to the output of the maximum voltage detector and a reset terminal R connected to the minimum voltage detector, the frequency generator having a first output (Q) connected to the switch driver and a second output ($\overline{Q}$) connected to the third switch, whereby the frequency generator generates, at the output (Q), a signal having a predetermined frequency based on the output signals of the maximum voltage detector and the minimum voltage detector.

28. The ballast as claimed in claim 27, wherein the frequency controller controls a voltage (aV) input to the voltage selector from the feedback section according to the following expression when a normal current flows through the lamp section:

$$V_{minref} < V_{ref} < aV < V_{maxref}$$

wherein $V_{minref}$ represents the minimum reference voltage, $V_{ref}$ the reference voltage, $V_{maxref}$ the maximum reference voltage.

29. The ballast as claimed in claim 27, wherein the frequency controller further comprises a third shutdown section including a comparator which has a first polar input connected to the third shutdown reference voltage, and a second polar input opposite to the first polar input in polarity and connected to one terminal of the charger, whereby the third shutdown section interrupts a current supply to the lamp section when a voltage is less than a third shutdown reference voltage.

30. The ballast as claimed in claim 27, wherein the switch driver comprises:

a frequency divider including one input and two outputs, the input being connected to the output (Q) of the frequency generator for receiving an on/off voltage having a predetermined frequency from the output (Q), whereby the frequency divider generates a 'high' signal to one output and a second 'high' signal to the other output;

a first driver including a first OR gate, a fourth transistor, and a fifth transistor, the first OR gate including an input, a first output, and a second output generating an opposite signal to the first output, the input of the first OR gate being connected to one output of the frequency divider, the base of the fourth transistor being connected to the first output of the first OR gate, the collector of the fourth transistor being connected to a transistor driving power source, the base of the fifth transistor being connected to the second output of the first OR gate, the collector of the fifth transistor being connected to the emitter of the fourth transistor, the emitter of the fifth transistor being grounded; and a second driver including a second OR gate, a sixth transistor, and a seventh transistor, the second OR gate including an input, a first output, and a second output generating an opposite signal to the first output, the input of the second OR gate being connected to the other output of the frequency divider, the base of the sixth transistor being connected to the first output of the second OR gate, the collector of the sixth transistor being connected to a transistor driving power source, the base of the seventh transistor being connected to the second output of the second OR gate, the collector of the seventh transistor being connected to the emitter of the sixth transistor, the emitter of the seventh transistor being grounded.

31. A lamp system comprising:

a power-factor compensator for rectifying AC power and improving the power factor of the rectified AC power to increase the effective power supplied to the lamp system, including;

a boost converter including a rectifier, a transformer, a first resistor, a second resistor, and a switching MOS FET (Field Effect Transistor), one terminal of the secondary coil of the transformer being connected to the second resistor, the source of the switching MOS FET being grounded via the first resistor, a contact between the source of the switching MOS FET and the first resistor being connected to a non-inverting input of a comparator;

an error amplifying section including an error amplifier having a first polar input for receiving a voltage (V1) divided via a third resistor and fourth resistor, one terminal of the third resistor being connected to the output of the boost converter, one terminal of the fourth resistor being connected to the third resistor, the other terminal of the fourth resistor being grounded, the error amplifier having a second polar input opposite to the first polar input in polarity and connected to a reference voltage ($V_{ref}$), whereby the error amplifier generates a difference between the two input voltages, i.e., ($V_{m2}-V_{ref}$);

an arithmetic section receiving a voltage ($V_{m1}$) divided via fifth resistor and sixth resistor to output a voltage ($V_{m0}$) as given by the following equation:

$$V_{m0}=K \times V_{m1} \times (V_{m2}-V_{ref})$$

wherein K is a proportional constant, one terminal of the rectifier being connected to the output voltage ($V_{m2}-V_{ref}$) of the error amplifier and one terminal of the fifth resistor, one terminal of the sixth resistor being connected to one terminal of the fifth resistor, the other terminal of the sixth resistor being connected to the other terminal of the fourth resistor;

- a comparator having a first polar input connected to an output voltage ($V_{m0}$) of the arithmetic circuit, and a second polar input opposite to the first polar input in polarity and connected to a voltage ($V_{cs}$) obtained by sensing the current flowing through the switching MOS FET, whereby the comparator compares the output voltage ($V_{m0}$) to the voltage ($V_{cs}$);
- a zero current detector for detecting the time when the current flowing through the secondary coil of the transformer becomes zero by the magnitude of a detected voltage ($V_{det}$) applied to the second resistor; and
- a switching driver including an SR latch, which has a set terminal S connected to the output of the zero current detector, and a reset terminal R connected to an output voltage ($V_{cso}$) of the comparator, the output (Q) of the switching driver being connected to the gate of the switching MOS FET,
- a current controller including first and second switches having on/off periods, the current controller being coupled to the on/off periods of the first and second switches for controlling the magnitude of a lamp driving current from the power-factor compensator;
- a lamp section including a resonance circuit composed of a resistor, an inductor and a capacitor, and emitting light under a current from the current controller;
- a ballast for forming a feedback voltage using a current flowing through the lamp section during the operation of the lamp including soft start and dimming control, and comparing the feedback voltage to a reference voltage to determine whether the current input to the lamp section is an overcurrent, an undercurrent, or a normal current, whereby the ballast controls the on/off periods of the first and second switches; and
- a dimming voltage controller for generating a dimming signal to the ballast to perform the dimming control of the lamp.

32. A lamp system comprising:
- a power-factor compensator for rectifying AC power and improving the power factor of the rectified AC power to increase the effective power supplied to the lamp system;
- a current controller including first and second switches having on/off periods, the current controller being coupled to the on/off periods of the first and second switches for controlling the magnitude of a lamp driving current from the power-factor compensator;
- a lamp section including a resonance circuit composed of a resistor, an inductor and a capacitor, and emitting light under a current from the current controller;
- a ballast for forming a feedback voltage using a current flowing through the lamp section during the operation of the lamp including soft start and dimming control, and comparing the feedback voltage to a reference voltage to determine whether the current input to the lamp section is an overcurrent, an undercurrent, or a normal current, whereby the ballast controls the on/off periods of the first and second switches, the ballast including,
- an undervoltage protector for preventing a malfunction of the lamp system, and generating an initial operating signal of the lamp system upon receiving a voltage of less than the voltage capable of operating the lamp system;
- a soft starter for gradually increasing a soft start voltage to a predetermined level to proceed a start-up of the lamp upon receiving the initial operating signal from the undervoltage protector;
- a dimming controller for gradually increasing a voltage for a dimming control even when an externally input dimming signal is changed in order to regulate the light intensity;
- a feedback section for comparing a feedback voltage formed based on the magnitude of the current flowing through the lamp with a reference voltage formed based on the output signals from the soft starter and the dimming controller to perform the operations of the lamp including soft start and soft dimming, and determining whether the current flowing through the lamp is an overcurrent, an undercurrent, or a normal current;
- a frequency controller for generating first and second frequencies for regulating the magnitude of the current input to the lamp based on a received signal from the feedback voltage, whereby the frequency controller generates the first frequency when the feedback voltage is greater than the reference voltage, the second frequency being generated when the feedback voltage is less than the reference voltage; and
- a switch driver coupled to the first and second frequencies to control the on/off state of the switch of the current controller; and
- a dimming voltage controller for generating a dimming signal to the ballast to perform the dimming control of the lamp.

33. The lamp system as claimed in claim 32, further comprising an overcurrent protector for stopping the operation of the switch driver upon detection of an overcurrent input to the lamp section, wherein the overcurrent is greater than a predetermined current level.

34. The lamp system as claimed in claim 32, further comprising a lamp selector for detecting the current of the lamp section varying depending on the number of lamps to change the magnitude of the reference voltage of the feedback section.

35. The lamp system as claimed in claim 32, wherein the undervoltage protector comprises:
- an ignition and operating voltage section for forming an ignition voltage for starting the entire system using a current from the power supply upon receiving a start signal of the entire system, and then forming an operation maintenance voltage for maintaining the operation of the entire system using a current from the current controller; and an undervoltage detector for comparing a voltage received from the ignition and operating voltage section to an undervoltage reference voltage, whereby the undervoltage detector holds of the start-up of the entire system upon receiving a voltage less than the ignition voltage.

36. The lamp system as claimed in claim 35, wherein the undervoltage protector further comprises a first shutdown section coupled to the output signal of the undervoltage detector, whereby the first shutdown section prevents the formation of a start voltage of the soft starter upon receiving a voltage of less than the ignition voltage.

37. The lamp system as claimed in claim 36, wherein the soft starter comprises:

a first current supply for supplying an electric charge;

a start voltage generator coupled to the output signal of the undervoltage detector to turn off the first shutdown section upon receiving the ignition voltage from the ignition and operating voltage section, and then coupled to the electric charge supplied from the first current supply, whereby the start voltage generator forms a gradually increasing start voltage;

a start reference voltage generator coupled to the start voltage gradually increased to a predetermined voltage, whereby the start reference voltage generator forms a gradually increasing reference voltage to be input to the feedback section; and a start frequency generator coupled to the start voltage applied to the start voltage generator during the initial operation of the entire system, whereby the start frequency generator outputs a signal for forming a start frequency from the frequency controller during the initial operation of the entire system.

38. The lamp system as claimed in claim 37, wherein the dimming controller comprises:

a dimming starter for comparing the start voltage formed at the start voltage generator with a dimming starting reference voltage, and performing dimming control by supplying an electric charge when the start voltage is greater than the dimming starting reference voltage; and a soft dimmer being coupled to an externally input dimming signal to form a voltage for determining the amount of electric charge accumulated in the dimming starter, the soft dimmer generating a reference voltage for soft dimming when the dimming signal is changed in order to regulate the intensity of the light from the lamp section, whereby a voltage applied to the dimming starter is gradually varied by a time delay of the dimming starter during the soft dimming.

39. The lamp system as claimed in claim 38, further comprising a second shutdown section for stopping the operation of the switch driver upon receiving a dimming signal being greater than the predetermined voltage.

40. The lamp system as claimed in claim 32, wherein the feedback section comprises:

a feedback voltage generator for generating a feedback voltage using the current flowing through the lamp section; and a reference voltage comparator receiving the feedback voltage from the feedback voltage generator and the output signals from the soft starter and the dimming controller to form a reference voltage during the operation of the lamp, and comparing the feedback voltage to the reference voltage to determine whether the current flowing through the lamp section is an overcurrent, an undercurrent, or a normal current relative to the reference voltage, the determination result being output to the frequency controller.

41. The lamp system as claimed in claim 33, wherein the overcurrent protector comprises:

an overcurrent detector for generating a voltage coupled to the current flowing through the current controller;

an overcurrent determiner for comparing the detected voltage from the overcurrent detector to an overcurrent detecting reference voltage to determine whether the detected voltage from the overcurrent detector is generated from an overcurrent; and a fourth shutdown section for stopping the operation of the switch driver upon receiving a signal from the overcurrent determiner indicating that an overcurrent is input.

42. The lamp system as claimed in claim 41, wherein the overcurrent determiner further comprises a first low pass filter for removing a high-frequency component from the detected voltage of the overcurrent detector.

43. The lamp system as claimed in claim 37, wherein the frequency controller comprises:

a voltage selector for receiving an initial voltage from the start frequency generator of the soft starter during the initial soft start, and comparing the reference voltage to a voltage output from the feedback section at the time when the current flows through the lamp section after an elapse of time;

a comparative voltage generator for generating a comparative voltage to facilitate triggering of an on/off signal having a predetermined frequency;

a maximum voltage detector for selecting the lower one of the output of the voltage selector and a maximum reference voltage to detect the maximum voltage to which the comparative voltage can be raised during the operation of the lamp section;

a minimum voltage detector for comparing a minimum reference voltage to the comparative voltage to detect the minimum voltage to which the comparative voltage can be dropped; and frequency generator for generating a signal coupled to the frequencies of the outputs of the maximum voltage detector and the minimum voltage detector.

44. The lamp system as claimed in claim 43, wherein the frequency generator further comprises a third shutdown section for stopping the operation of the switch driver when the comparative voltage formed at the comparative voltage generator is less than a predetermined voltage.

45. The lamp system as claimed in claim 43, wherein the comparative voltage generator comprises:

a charger for accumulating an electric charge;

a charge supply for supplying the electric charges to the charger;

a charge remover for removing the electric charge from the charger; and a switch being switched upon receiving the output signal of the frequency generator to operate the charge remover.

46. The lamp system as claimed in claim 43, wherein the switch driver comprises:

a frequency divider including two outputs and receiving an on/off signal having a predetermined frequency from the frequency generator, whereby the frequency divider outputs an x signal at one output and an x+1 signal at the other output;

a first driver connected to one output of the frequency divider and driven upon receiving the x signal; and a second driver connected to the other output of the frequency divider and driven upon receiving the x+1 signal.

47. The lamp system as claimed in claim 34, wherein the lamp selector comprises:

a lamp number detector for detecting a voltage, varying depending on the number of lamps, coupled to the current of the lamp section; and a reference voltage regulator for comparing the detected voltage from the lamp number detector to the N regulating voltage (where N is a natural number) to detect the M regulating voltage and the (M+1) regulating voltage (where M is a natural number from 1 to M) indicating the positions of the detected voltages of the lamp number detector, whereby the reference voltage regulator reduces the reference voltage of the feedback section coupled to the M.

48. The lamp system as claimed in claim 39, further comprising a shutdown controller for receiving the output signals of the second shutdown section, and stopping the operation of the switch driver when at least one of the output signals of the second shutdown section is a shutdown signal.

49. The lamp system as claimed in claim 32, wherein the dimming voltage controller comprises:

a signal transmitter including a radio signal transmitter and a wire signal transmitter for transmitting a signal for the user to control the lamp system including an on/off control and a light intensity control;

a radio signal receiver for receiving an output signal from the radio signal transmitter when the signal transmitter is the radio signal transmitter; a signal interpreter for receiving the output signal of the radio signal receiver, and the output signal of the wire signal transmitter when the signal transmitter is the wire signal transmitter, and interpreting the control content of the lamp system including an on/off control and a light intensity control; and a dimming voltage output coupled to the output signal from the signal interpreter to output a dimming voltage $V_{dm}$ in a predefined range.

* * * * *

UNITED STATES PATENT AND TRADEMARK OFFICE
CERTIFICATE OF CORRECTION

PATENT NO.    : 6,504,315 B2
DATED         : January 7, 2003
INVENTOR(S)   : Kim It is certified that error appears in the above-identified patent and that said Letters Patent is hereby corrected as shown below:

<u>Title page,</u>
Item [*], should read:
-- [*] Notice:  Subject to any disclaimer, the term of this patent is extended or adjusted under 35 U.S.C. 154(b) by "0" days. --

Signed and Sealed this

Twenty-eighth Day of October, 2003

JAMES E. ROGAN
*Director of the United States Patent and Trademark Office*